(12) United States Patent
Tan et al.

(10) Patent No.: US 11,788,618 B2
(45) Date of Patent: Oct. 17, 2023

(54) HYDRAULIC CONTROL SYSTEM

(71) Applicants: TOYOTA JIDOSHA KABUSHIKI KAISHA, Toyota (JP); AISIN CORPORATION, Kariya (JP)

(72) Inventors: Guodong Tan, Toyota (JP); Masayasu Mizobuchi, Nisshin (JP); Masayuki Baba, Toyota (JP); Yu Nagasato, Gotenba (JP); Yoshio Hasegawa, Chiryu (JP); Kensuke Wada, Kariya (JP); Sari Uchiyama, Kariya (JP)

(73) Assignees: TOYOTA JIDOSHA KABUSHIKI KAISHA, Toyota (JP); AISIN CORPORATION, Kariya (JP)

( * ) Notice: Subject to any disclaimer, the term of this patent is extended or adjusted under 35 U.S.C. 154(b) by 0 days.

(21) Appl. No.: 18/112,817

(22) Filed: Feb. 22, 2023

(65) Prior Publication Data

US 2023/0265919 A1 Aug. 24, 2023

(30) Foreign Application Priority Data

Feb. 24, 2022 (JP) ................................. 2022-027247

(51) Int. Cl.
*F16H 61/02* (2006.01)
*F16H 61/686* (2006.01)

(52) U.S. Cl.
CPC ....... *F16H 61/0206* (2013.01); *F16H 61/686* (2013.01); *F16H 2061/0209* (2013.01)

(58) Field of Classification Search
CPC ............... F16H 61/0206; F16H 61/686; F16H 2061/0209; F16H 61/143; B60K 6/387
See application file for complete search history.

(56) References Cited

U.S. PATENT DOCUMENTS

| | | | | |
|---|---|---|---|---|
| 5,620,390 A | * | 4/1997 | Kono | F16H 61/143 477/169 |
| 9,382,953 B2 | * | 7/2016 | Kuwahara | F16D 48/02 |
| 2010/0236887 A1 | * | 9/2010 | Sakamoto | F16H 61/12 192/3.3 |

FOREIGN PATENT DOCUMENTS

| | | | | |
|---|---|---|---|---|
| CN | 100439766 C | * | 12/2008 | ......... F16H 61/0021 |
| JP | H0979370 A | * | 3/1997 | |
| JP | 2020063818 A | | 4/2020 | |
| JP | 2021038767 A | | 3/2021 | |

* cited by examiner

*Primary Examiner* — Sherry L Estremsky
(74) *Attorney, Agent, or Firm* — Dinsmore & Shohl LLP

(57) ABSTRACT

A hydraulic control system includes a linear solenoid valve, an ON-OFF solenoid valve and a hydraulically-operated frictional engagement device. A first hydraulic pressure is regulated by the linear solenoid valve within a predetermined pressure-regulation control range, and is supplied to the frictional engagement device. In a state in which the frictional engagement device is placed in a predetermined engaged state based on the first hydraulic pressure, a second hydraulic pressure, which is higher than the pressure-regulation control range, is supplied from the ON-OFF solenoid valve to the frictional engagement device, such that the frictional engagement device is placed in a fully engaged state with a high engaging torque based on the second hydraulic pressure.

8 Claims, 12 Drawing Sheets

HYDRAULIC CONTROL SYSTEM

CROSS-REFERENCE TO RELATED APPLICATIONS

This application claims priority from Japanese Patent Application No. 2022-027247 filed on Feb. 24, 2022, the disclosure of which is herein incorporated by reference in its entirety.

TECHNICAL FIELD

The present disclosure relates to a hydraulic control system, particularly, to the hydraulic control system capable of providing high accuracy and responsiveness in a predetermined hydraulic pressure range even in case in which a frictional engagement device requires a large torque capacity when the frictional engagement device is fully engaged.

BACKGROUND

There is known a hydraulic control system including (i) a linear solenoid valve configured to continuously change a hydraulic pressure, (ii) an ON-OFF solenoid valve configured to output and stop outputting the hydraulic pressure, (iii) a hydraulically-operated frictional engagement device that is to be engaged with an engaging torque that is based on the hydraulic pressure supplied to the frictional engagement device. JP-2020-63818A discloses an example of such a hydraulic control system. In the disclosed hydraulic control system, there are two frictional engagement devices, i.e., a first clutch C1 and a second clutch C2, such that the hydraulic pressure is supplied from the linear solenoid valve to the second clutch C2 in which the engaging torque needs to be continuously changed, and such that the hydraulic pressure is supplied from the ON-OFF solenoid valve to the first clutch C1 in which the engaging torque does not need to be continuously changed. It is noted that, in the present specification and the appended claims, the term "supply of a hydraulic pressure" may be interpreted to mean "supply of a working fluid having the hydraulic pressure".

SUMMARY

However, where the engaging torque of the frictional engagement device is to be continuously changed by the linear solenoid valve, if the frictional engagement device requires a large torque capacity when the frictional engagement device is fully engaged, the hydraulic pressure needs to controlled over a wide range, so that there is a problem that control accuracy and responsiveness of the hydraulic pressure, i.e., the engaging torque are reduced. It might be possible to improve them by employing a large-sized linear solenoid valve, however, which results in cost increase.

The present disclosure was made in view of the background art described above. It is therefore an object of the present disclosure to provide a hydraulic control system which is inexpensive and which is capable of providing high accuracy and responsiveness in a predetermined hydraulic pressure range even in case in which a frictional engagement device requires a large torque capacity when the frictional engagement device is fully engaged.

The object indicated above is achieved according to the following aspects of the present disclosure.

According to a first aspect of the disclosure, there is provided a hydraulic control system including (i) a linear solenoid valve configured to continuously change a hydraulic pressure, (ii) an ON-OFF solenoid valve configured to output and stop outputting the hydraulic pressure, and (iii) a hydraulically-operated frictional engagement device that is to be engaged with an engaging torque that is based on the hydraulic pressure supplied to the frictional engagement device. The hydraulic control system includes: a hydraulic control circuit is configured such that a first hydraulic pressure as the hydraulic pressure that is regulated by the linear solenoid valve and a second hydraulic pressure as the hydraulic pressure that is outputted through an ON-OFF switching of the ON-OFF solenoid valve are suppliable to the same frictional engagement device, and such that the first hydraulic pressure is regulated by the linear solenoid valve to be within a predetermined pressure-regulation control range that is lower than the second hydraulic pressure; and an engagement control portion configured to supply the first hydraulic pressure to the frictional engagement device while causing the linear solenoid valve to regulate the first hydraulic pressure within the pressure-regulation control range. The engagement control portion is configured, in a state in which the frictional engagement device is placed in a predetermined engaged state based on the first hydraulic pressure, to supply the second hydraulic pressure to the frictional engagement device through the ON-OFF switching of the ON-OFF solenoid valve, such that the frictional engagement device is placed in a fully engaged state with the engaging torque based on the second hydraulic pressure.

It is noted that the above-described predetermined engaged state based on the first hydraulic pressure is interpreted to mean either a slipping engaged state with slipping of the frictional engagement device by a predetermined engaging torque or an engaged state without slipping of the frictional engagement device.

According to a second aspect of the disclosure, in the hydraulic control system according to the first aspect of the disclosure, the engagement control portion is configured to execute an engagement control for placing the frictional engagement device in the engaged state with or without slipping of the frictional engagement device, by causing the first hydraulic pressure supplied to the frictional engagement device, to be regulated within the pressure-regulation control range by the linear solenoid valve, wherein the engagement control portion is configured, in a state in which the frictional engagement device is engaged based on the first hydraulic pressure without the slipping of the frictional engagement device, to place the frictional engagement device in the fully engaged state, by supplying the second hydraulic pressure to the frictional engagement device through the ON-OFF switching of the ON-OFF solenoid valve.

According to a third aspect of the disclosure, in the hydraulic control system according to the first or second aspect of the disclosure, there is provided a switch valve that is switched, by the hydraulic pressure outputted by the ON-OFF solenoid valve, between an output state in which the switch valve outputs the second hydraulic pressure and an output stop state in which the switch valve stops outputting the second hydraulic pressure.

According to a fourth aspect of the disclosure, in the hydraulic control system according to any one of the first through third aspects of the disclosure, the frictional engagement device is a connection/disconnection device which is disposed between an engine and a rotating machine that are provided in a vehicle, wherein the connection/disconnection device is configured to connect and disconnect transmission of a power between the engine and the rotating machine.

According to a fifth aspect of the disclosure, in the hydraulic control system according to the fourth aspect of the disclosure, the engagement control portion is configured, in a state in which the rotating machine is driven to be rotated at a predetermined rotational speed, to cause the first hydraulic pressure to be supplied to the connection/disconnection device, and is configured to cause the first hydraulic pressure to be regulated within the pressure-regulation control range by the linear solenoid valve, such that the engine is cranked by a slip engagement of the connection/disconnection device based on the first hydraulic pressure, wherein the engagement control portion is configured, in a complete explosion state in which the engine has become self-rotated by an engine start processing including fuel injection and ignition, to place the frictional engagement device in the fully engaged state, by supplying the second hydraulic pressure to the frictional engagement device through the ON-OFF switching of the ON-OFF solenoid valve.

According to a sixth aspect of the disclosure, in the hydraulic control system according to any one of the first through third aspects of the disclosure, the frictional engagement device is a lockup clutch of a fluid transmission device that is provided in a vehicle.

According to a seventh aspect of the disclosure, in the hydraulic control system according to any one of the first through third aspects of the disclosure, the frictional engagement device is a starting clutch which is disposed between a drive power source and a power transmission apparatus that are provided in a vehicle, wherein the starting clutch is configured to connect and disconnect transmission of a power between the drive power source and the power transmission apparatus.

According to an eighth aspect of the disclosure, in the hydraulic control system according to the seventh aspect of the disclosure, the engagement control portion is configured, in a state in which the drive power source is driven to be rotated at a predetermined rotational speed, to cause the first hydraulic pressure to be supplied to the starting clutch, and is configured to cause the first hydraulic pressure to be regulated within the pressure-regulation control range by the linear solenoid valve, such that the vehicle is started to run by a slip engagement of the starting clutch based on the first hydraulic pressure, wherein the engagement control portion is configured, in a state in which the vehicle has been started to run, to place the starting clutch in the fully engaged state, by supplying the second hydraulic pressure to the starting clutch through the ON-OFF switching of the ON-OFF solenoid valve.

In the hydraulic control system according to any one of the first through eighth aspects of the disclosure, the engaging torque of the frictional engagement device is continuously changed with the first hydraulic pressure supplied to the frictional engagement device being regulated by the linear solenoid valve, and the frictional engagement device is placed in the fully engaged state with a high engaging torque when the second hydraulic pressure is supplied to the frictional engagement device through the ON-OFF switching of the ON-OFF solenoid valve. Thus, it is sufficient that the linear solenoid valve is capable of regulating the first hydraulic pressure within the predetermined pressure-regulation control range that is lower than the second hydraulic pressure. That is, it is possible to narrower the control range within which the hydraulic pressure is to be controlled by the linear solenoid valve, and accordingly to increase control accuracy and responsiveness of the linear solenoid valve. Therefore, it is possible to cause the second hydraulic pressure to provide a large torque capacity required when the frictional engagement device is fully engaged, and to control the engaging torque of the frictional engagement device with high accuracy and responsiveness by regulation of the first hydraulic pressure through the linear solenoid valve when the engaging torque needs to be finely controlled, for example, in a slip engagement region. Further, since the control can be made by merely cooperation of the linear solenoid valve and the ON-OFF solenoid valve, the hydraulic control system as a whole can be constructed at a low cost.

In the hydraulic control system according to the second aspect of the disclosure, the engagement control is executed for placing the frictional engagement device in the engaged state with or without slipping of the frictional engagement device, by causing the first hydraulic pressure supplied to the frictional engagement device, to be regulated within the pressure-regulation control range by the linear solenoid valve, and the frictional engagement device is placed in the fully engaged state, by supplying the second hydraulic pressure to the frictional engagement device through the ON-OFF switching of the ON-OFF solenoid valve in the state in which the frictional engagement device is engaged based on the first hydraulic pressure without the slipping of the frictional engagement device. Thus, it is possible to smoothly switch the frictional engagement device from the slipping engaged state established by the first hydraulic pressure to the fully engaged state established by the second hydraulic pressure, while suppressing an engagement shock or the like.

In the hydraulic control system according to the third aspect of the disclosure, the switch valve is provided to be switched, by the hydraulic pressure outputted by the ON-OFF solenoid valve, between the output state in which the switch valve outputs the second hydraulic pressure and the output stop state in which the switch valve stops outputting the second hydraulic pressure. Thus, it is possible to obtain a sufficient amount of working fluid having the second hydraulic pressure and to place the frictional engagement device into the fully engaged state with high responsiveness.

In the hydraulic control system according to the fourth aspect of the disclosure, the frictional engagement device is the connection/disconnection device. The large torque capacity is provided by the second hydraulic pressure when the connection/disconnection device is fully engaged, and the engaging torque of the connection/disconnection device can be controlled with high accuracy and responsiveness by regulation of the first hydraulic pressure through the linear solenoid valve when the engaging torque needs to be finely controlled, for example, in the slip engagement region. Thus, it is possible to assure the large torque capacity required to transmit a large drive power during running of the vehicle, and to appropriately control the torque capacity for transmitting the torque between the engine and the rotating machine, for example, upon start of running of the vehicle by the engine and upon start of the engine by the rotating machine.

In the hydraulic control system according to the fifth aspect of the disclosure, the first hydraulic pressure is supplied to the connection/disconnection device in the state in which the rotating machine is driven to be rotated at the predetermined rotational speed, and is regulated within the pressure-regulation control range by the linear solenoid valve, such that the engine is cranked by the slip engagement of the connection/disconnection device based on the first hydraulic pressure. Further, in the complete explosion state in which the engine has become self-rotated by the engine start processing including the fuel injection and ignition, the frictional engagement device is placed in the fully engaged state by supplying the second hydraulic pressure to the frictional engagement device through the ON-OFF switching of the ON-OFF solenoid valve. Therefore, it is sufficient that the linear solenoid valve, which is operated to control the slipping engaged state of the connection/disconnection device upon cranking of the engine, is capable of regulating the first hydraulic pressure within the pressure-regulation control range which is lower than the second hydraulic pressure and which does not have to be wide and may be narrow. Thus, the slip engaging torque of the connection/ disconnection device upon cranking of the engine is controlled by the linear solenoid valve with high accuracy and high responsiveness, so that it is possible to start the engine by appropriately cranking the engine. Further, in the complete explosion state of the engine, the connection/disconnection device is placed in the fully engaged state with the large torque capacity based on the second hydraulic pressure, so that a large engine torque can be reliably transmitted through the connection/disconnection device during running of the vehicle.

In the hydraulic control system according to the sixth aspect of the disclosure, the frictional engagement device is the lockup clutch. The large torque capacity is provided by the second hydraulic pressure when the lockup clutch is fully engaged, and the engaging torque of the lockup clutch can be controlled with high accuracy and responsiveness by regulation of the first hydraulic pressure through the linear solenoid valve when the engaging torque needs to be finely controlled, for example, in the slip engagement region. Thus, it is possible to assure the large torque capacity required to transmit a large drive power during running of the vehicle, and to appropriately control the slip engaging torque of the lockup clutch upon the slip engagement control and upon start of running of the vehicle, for example.

In the hydraulic control system according to the seventh aspect of the disclosure, the frictional engagement device is the starting clutch. The large torque capacity is provided by the second hydraulic pressure when the starting clutch is fully engaged, and the engaging torque of the starting clutch can be controlled with high accuracy and responsiveness by regulation of the first hydraulic pressure through the linear solenoid valve when the engaging torque needs to be finely controlled, for example, in the slip engagement region. Thus, it is possible to assure the large torque capacity required to transmit a large drive power during running of the vehicle, and to appropriately control the slip engaging torque of the starting clutch upon start of running of the vehicle, for example.

In the hydraulic control system according to the eighth aspect of the disclosure, during normal running of the vehicle after start of the running, the starting clutch is placed in the fully engaged state with the second hydraulic pressure (that is a high hydraulic pressure) being supplied to the starting clutch by the ON-OFF switching of the ON-OFF solenoid valve. Therefore, it is sufficient that the linear solenoid valve, which is operated to control the slipping engaged state of the starting clutch upon cranking of the engine, is capable of regulating the first hydraulic pressure within the pressure-regulation control range which is lower than the second hydraulic pressure and which does not have to be wide and may be narrow. Thus, the slip engaging torque of the starting clutch upon cranking of the engine is controlled by the linear solenoid valve with high accuracy and high responsiveness, so that it is possible to smoothly start the vehicle to run. Further, after start of running of the vehicle, the starting clutch is placed in the fully engaged state with the large torque capacity based on the second hydraulic pressure, so that a large torque of the drive power source can be reliably transmitted through the starting clutch during running of the vehicle.

DETAILED DESCRIPTION OF EMBODIMENTS

Figure 1:
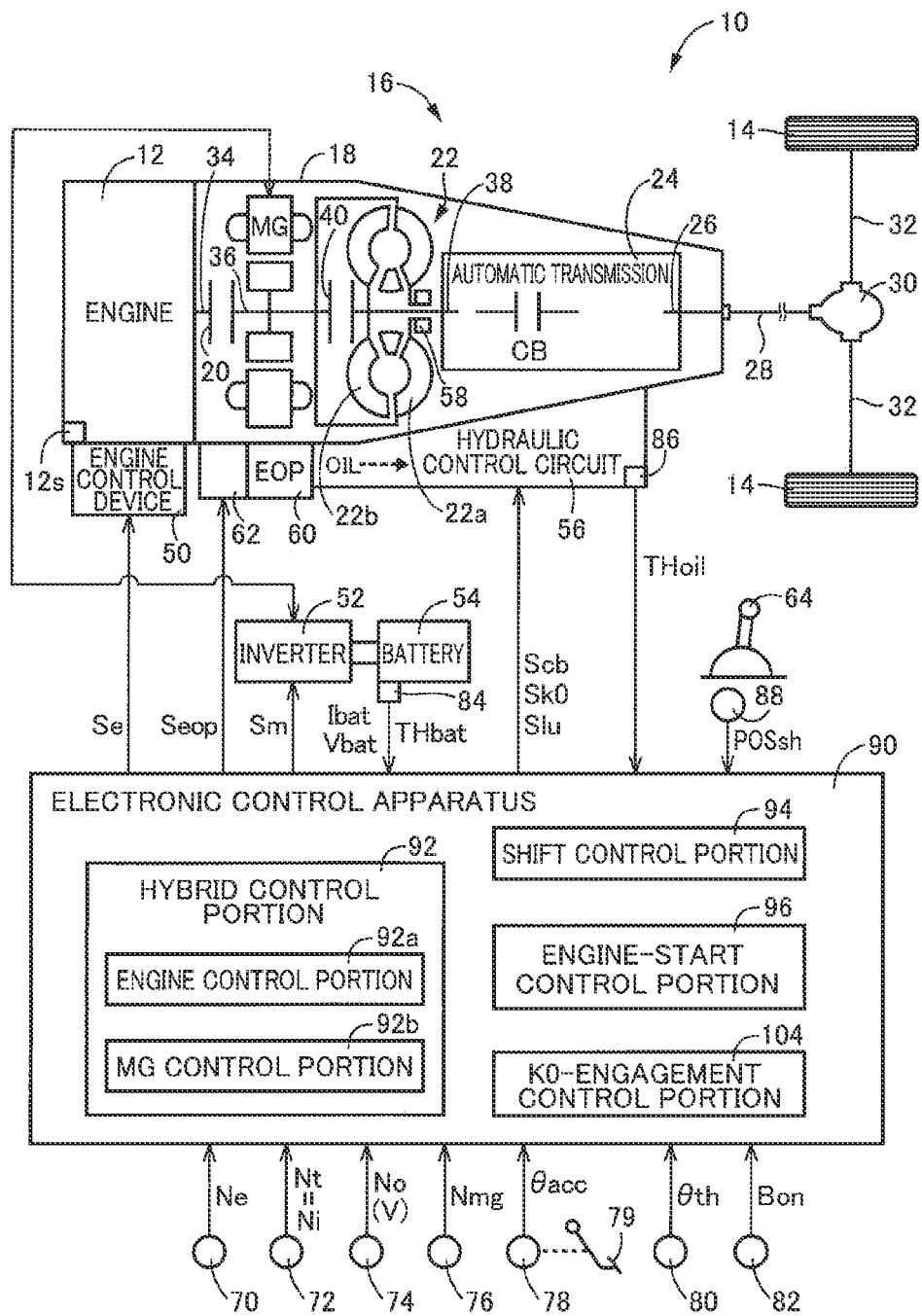
FIG. 1 is a view schematically showing a construction of a drive system of a hybrid electrically-operated vehicle including a hydraulic control system as an embodiment of the present disclosure, together with major portions of control functions and systems for executing various kinds of controls in the vehicle.

The present disclosure is applied to a hydraulic control system for a vehicle. However, the disclosure is applicable also to a hydraulic control system for a machine or apparatus that is other than a vehicle, as long as the hydraulic control system includes a frictional engagement device in which a large torque capacity is required when the frictional engagement device is fully engaged and in which an engaging torque needs to be controlled with high accuracy and responsiveness in a predetermined engaging torque region such as a slip engagement region. Where the hydraulic control system is to be used for a vehicle, the vehicle may be any one of various kinds of vehicles such as a parallel-type hybrid electrically-operated vehicle or series-type hybrid electrically-operated vehicle including an engine and a rotating machine serving as drive power sources, an engine drive vehicle including only an engine serving as a drive power source, and an electric vehicle including only a rotating machine serving as a drive power source. As the rotating machine serving as the drive power source, embodiments employ a motor generator which has a function serving as an electric motor and a function serving as an electric power generator so as to be used as a selected one of the electric motor and the electric power generator. However, it is also possible to employ, as the rotating machine, an electric motor without a function serving as an electric power generator.

The frictional engagement device, which is subjected to be controlled by the hydraulic control system, may be any one of various kinds of clutches or brakes of multiple-disc type or single-disc type, wherein the clutch or brake may be of either wet type or dry type. The hydraulic control system for a vehicle, is used for controlling, for example, a connection/disconnection device provided between an engine and a rotating machine, a lockup clutch provided in a fluid transmission device or a starting clutch provided between a drive power source or a power transmission apparatus. However, the present disclosure is applicable to any other hydraulically-operated frictional engagement device in which a large torque capacity is required when the frictional engagement device is fully engaged and in which an engaging torque needs to be controlled with high accuracy and responsiveness in a predetermined engaging torque region.

The hydraulic control circuit of the hydraulic control system may be provided with a hydraulic control valve which is configured to receive a signal pressure in the form of a hydraulic pressure outputted from a linear solenoid valve and to continuously change the above-described first hydraulic pressure in accordance with the signal pressure, and may be provided with a switch valve which is configured to receive a hydraulic pressure outputted from an ON-OFF solenoid valve and which is to be switched, by the hydraulic pressure outputted by the ON-OFF solenoid valve, between an output state in which the switch valve outputs the above-described second hydraulic pressure and an output stop state in which the switch valve stops outputting the second hydraulic pressure. However, the provisions of the above-described hydraulic control valve and the switch valve are not essential for the present disclosure. For example, it is also possible to adapt the hydraulic pressure outputted from the linear solenoid valve, to be directly supplied as the first hydraulic pressure to the frictional engagement device, and to adapt the hydraulic pressure outputted from the ON-OFF solenoid valve, to be directly supplied as the second hydraulic pressure to the frictional engagement device. Further, the switch valve may be configured, when supplying the second hydraulic pressure to the frictional engagement device, to inhibit the first hydraulic pressure from being supplied to the frictional engagement device. Thus, the hydraulic control circuit of the hydraulic control system may be modified as needed. The above-described predetermined pressure-regulation control range, within which the first hydraulic pressure is to be regulated by the linear solenoid valve, is set to be from 0 to an upper limit pressure value that is lower than the second hydraulic pressure, for example. However, the pressure-regulation control range may be also set to be from a lower limit value that is higher than 0 to the upper limit pressure value.

In embodiments the above-described engagement control portion of the hydraulic control system places the frictional engagement device into the fully engaged state, by supplying the second hydraulic pressure to the frictional engagement device through an ON-OFF switching of the ON-OFF solenoid valve, in a state in the frictional engagement device is engaged without slipping of the frictional engagement device, by causing the first hydraulic pressure (supplied to the frictional engagement device) to be regulated within the pressure-regulation control range by the linear solenoid valve. However, it is also possible to place the frictional engagement device into the fully engaged state, by supplying the second hydraulic pressure to the frictional engagement device through an ON-OFF switching of the ON-OFF solenoid valve, in a state in the frictional engagement device is engaged with slipping of the frictional engagement device. Further, where the engagement control portion is capable of placing the frictional engagement device in the fully engaged state by supplying the second hydraulic pressure to the frictional engagement device in a state in which the frictional engagement device is in a predetermined engaged state based on the first hydraulic pressure, it is also possible to place the frictional engagement device directly into the fully engaged state by supplying the second hydraulic pressure to the frictional engagement device without supplying the first hydraulic pressure to the frictional engagement device, and to switch the frictional engagement device from the fully engaged state directly to its released state by stopping supply of the second hydraulic pressure to the frictional engagement device. Thus, the engagement control portion may be adapted to control an operation state of the frictional engagement device in any of various manners, by using at least one of the linear solenoid valve and the ON-OFF solenoid valve.

EMBODIMENTS

There will be described embodiments of the present disclosure in details with reference to drawings. It is noted that figures of the drawings are simplified or deformed as needed, and each portion is not necessarily precisely depicted in terms of dimension ratio, shape, angle, etc.

FIG. 1 is a view schematically showing a construction of a drive system of a hybrid electrically-operated vehicle 10 (hereinafter simply referred to as "vehicle 10") including a hydraulic control system 100 (see FIG. 2) as an embodiment of the present disclosure, together with major portions of control functions and systems for executing various kinds of controls in the vehicle 10. As shown in FIG. 1, the vehicle 10 is a parallel-type hybrid electrically-operated vehicle including an engine 12 and a rotating machine MG as drive power sources for driving the vehicle 10. The vehicle 10 further includes a power transmission apparatus 16 that is provided in a power transmission path between the engine 12 and drive wheels 14. The drive wheels 14 are rear left and right wheels 14. The vehicle 10 is a front-engine rear-drive vehicle in which the engine 12 and the rotating machine MG are disposed in a front portion of the vehicle 10.

The engine 12 is an internal combustion engine such as gasoline engine and diesel engine. The vehicle 10 is provided with an engine control device 50 that includes a throttle actuator, a fuel injection device and an ignition device. With the engine control device 50 being controlled by the electronic control apparatus 90, an engine torque Te, which is an output torque of the engine 12, is controlled. The engine 12 includes a starter 12s for cranking the engine 12, although the engine 12 can be started also by cranking by the rotating machine MG. The rotating machine MG is a motor generator having a function serving as an electric motor configured to generate a mechanical power from an electric power and a function serving as an electric power generator configured to generate an electric power from a mechanical power. The rotating machine MG is a three-phase AC synchronous motor, for example, and is connected to a battery 54 provided in the vehicle 10, through an inverter 52 provided in the vehicle 10. The inverter 52 is controlled by the electronic control apparatus 90 whereby an MG torque Tmg as a torque of the rotating machine MG and an MG rotational speed Nmg as a rotational speed of the rotating machine MG are controlled. The rotating machine MG receives the electric power from the battery 54 through the inverter 52, and generates a drive power for driving the vehicle 10, in place of or in addition to the engine 12. Further, when being driven and rotated by the power of the engine 12 or by a driven power inputted from the drive wheels 14, the rotating machine MG is subjected to the regenerative control so as to serve as the electric power generator for generating the electric power, and so as to generate a regenerative brake if being connected to the drive wheels 14. The electric power generated by the rotating machine MG is stored in the battery 54 through the inverter 52. The battery 54 serves as an electric storage device configured to receive and supply the electric power from and to the rotating machine MG.

The power transmission apparatus 16 includes a casing 18, a K0 clutch 20, a torque converter 22 and an automatic transmission 24. In the casing 18 that is a non-rotary member attached to a body of the vehicle 10, the engine 12, the K0 clutch 20, the torque converter 22 and the automatic transmission 24 are arranged in a series in this order of description in a direction away from the engine 12. The rotating machine MG is disposed between the K0 clutch 20 and the torque converter 22 in a power transmission path between the engine 12 and the drive wheels 14. The K0 clutch 20 is a connecting/disconnecting device that is disposed between the engine 12 and the rotating machine MG in the power transmission path, so as to selectively connect and disconnect between the rotating machine MG and the engine 12. The torque converter 22 is a fluid transmission device that is disposed between the rotating machine MG and the automatic transmission 24 in the in the power transmission path, so as to transmit the power through a working fluid OIL. The torque converter 22 is connected to the engine 12 through the K0 clutch 20. The automatic transmission 24 is connected to the torque converter 22, and is disposed between the engine 12 and the drive wheels 14 in the power transmission path. The power transmission apparatus 16 further includes a propeller shaft 28 connected to a transmission output shaft 26 as an output rotary member of the automatic transmission 24, a difference gear device 30 connected to the propeller shaft 28, and a pair of drive shafts 32 connected to the differential gear device 30. The power transmission apparatus 16 still further includes an engine connection shaft 34 connecting between the engine 12 and the K0 clutch 20 and an MG connection shaft 36 connecting between the K0 clutch 20 and the torque converter 22. The MG connection shaft 36 is connected to a rotor of the rotating machine MG.

The K0 clutch 20 is, for example, a wet-type or dry-type frictional engagement device (wet-type frictional engagement device in the present embodiment) constituted by a multiple-disc type or single-disc type clutch that is to be pressed by a hydraulic actuator. A K0 clutch torque (engaging torque) Tk0 as a torque capacity of the K0 clutch 20 is changed by a regulated K0 hydraulic pressure Pk0 supplied to the K0 clutch 20 from a hydraulic control circuit (hydraulic control unit) 56, whereby a control or operation state of the K0 clutch 20 is switched between an engaged state and a released state, for example. The K0 clutch 20 includes an input-side member that is connected to the engine connection shaft 34 so as to be rotated integrally with the engine connection shaft 34. The K0 clutch 20 further includes an output-side member that is connected to the MG connection shaft 36 so as to be rotated integrally with the MG connection shaft 36. When the K0 clutch 20 is in the engaged state, the rotor of the rotating machine MG and a pump impeller 22a of the torque converter 22 are rotatable integrally with the engine 12 through the engine connection shaft 34. When the K0 clutch 20 is in the released state, transmission of the power between the engine 12 and the rotor of the rotating machine MG and the pump impeller 22a of the torque converter 22 is disconnected.

Inside the casing 18, the rotating machine MG is connected to the MG connection shaft 36 in a power transmittable manner. The rotating machine MG is connected to the power transmission path between the engine 12 and the drive wheels 14, particularly, to a part of the power transmission path in a power transmittable manner, wherein the part of the power transmission path is located between the K0 clutch 20 and the torque converter 22. That is, the rotating machine MG is connected to each of the torque converter 22 and the automatic transmission 24 in a power transmittable manner, without through the K0 clutch 20. Each of the torque converter 22 and the automatic transmission 24 is configured to transmit a drive power of each of the engine 12 and the rotating machine MG that serves as the drive power sources.

The torque converter 22 includes the above-described pump impeller 22a connected to the MG connection shaft 36 and a turbine impeller 22b connected to a transmission input shaft 38 as an input rotary member of the automatic transmission 24. The pump impeller 22a is connected to the engine 12 though the K0 clutch 20, and is connected directly to the rotating machine MG. The pump impeller 22a is an input member of the torque converter 22 while the turbine impeller 22b is an output member of the torque converter 22. The MG connection shaft 36 serves also as the input rotary member of the torque converter 22. The transmission input shaft 38 is provided integrally with a turbine shaft that is to be driven and rotated by the turbine impeller 22b, and serves also the output rotary member of the torque converter 22. The torque converter 22 further includes an LU clutch 40 that is configured to selectively connect and disconnect between the pump impeller 22a and the turbine impeller 22b. The LU clutch 40 is a known lockup clutch, i.e., a direct clutch provided to connect between the input and output rotary members of the torque converter 22.

An LU clutch torque (engaging torque) Tlu as a torque capacity of the LU clutch 40 is changed by a regulated LU hydraulic pressure Plu supplied to the LU clutch 40 from the hydraulic control circuit 56, whereby a control or operation state of the LU clutch 40 is switched among a released state, a slipping engaged state and an engaged state. In the released sate, the LU clutch 40 is fully released whereby the torque converter 22 is placed in a torque-converter state providing a torque boosting effect. In the slipping engaged state, the LU clutch 40 is engaged while slipping. In the engaged state that is a lockup state (fully engaged state), the LU clutch 40 is fully engaged whereby the pump impeller 22a and the turbine impeller 22b of the torque converter 22 are to be rotated integrally with each other.

The automatic transmission 24 is a known planetary-gear-type automatic transmission including at least one planetary gear device and a plurality of engagement devices CB. Each of the engagement devices CB is a hydraulically-operated frictional engagement device in the form of a multiple-disc type or a single-disc type clutch or brake that is to be pressed by a hydraulic actuator, or a band brake that is to be tightened by a hydraulic actuator, for example. Each of the engagement devices CB is configured to receive a CB hydraulic pressure Pcb that is a regulated hydraulic pressure supplied from the hydraulic control circuit 56, whereby a CB torque Tcb, i.e., torque capacity of the engagement device CB is changed and its controlled or operation state is switched between an engaged state and a released state, for example.

The automatic transmission 24 is a step-variable automatic transmission configured to establish a selected one of a plurality of gear positions, with a corresponding one or ones of the engagement devices CB being engaged, wherein the gear positions are different from each other in gear ratio (speed ratios) γ(=AT input rotational speed Ni/AT output rotational speed No), and wherein the plurality of gear positions include a plurality of forward-drive gear positions and a reverse-drive gear position. The automatic transmission 24 is configured to switch from one of the gear positions to another one of the gear positions, namely, to establish one of the gear positions which is selected, by the electronic control apparatus 90, depending on, for example, an acceleration operation made by a vehicle driver (operator) and a running speed V of the vehicle 10. With all of the engagement devices CB being released, the automatic transmission 24 is placed in a neutral state in which transmission of the power is disconnected. The AT input rotational speed Ni is a rotational speed of the transmission input shaft 38, and is an input rotational speed of the automatic transmission 24. The AT input rotational speed Ni is also a rotational speed of the output rotary member of the torque converter 22, and is equal to a turbine rotational speed Nt that is the output rotational speed of the torque converter 22. The AT output rotational speed No is a rotational speed of the transmission output shaft 26, and is an output rotational speed of the automatic transmission 24.

In the power transmission apparatus 16, when the K0 clutch 20 is engaged, the power outputted by the engine 12 is transmitted from the engine connection shaft 34 to the drive wheels 14, sequentially through the K0 clutch 20, MG connection shaft 36, torque converter 22, automatic transmission 24, propeller shaft 28, differential gear device 30 and drive shafts 32, for example. Further, irrespective of the operation state of the K0 clutch 20, the power outputted by the rotating machine MG is transmitted from the MG connection shaft 36 to the drive wheels 14, sequentially through the torque converter 22, automatic transmission 24, propeller shaft 28, differential gear device 30 and drive shafts 32, for example.

The vehicle 10 includes an MOP 58 that is a mechanical fluid pump (mechanical oil pump), an EOP 60 that is an electric fluid pump (electric oil pump) and a pump motor 62.

The MOP 58 is connected to the pump impeller 22a, so as to be driven and rotated by the drive power sources (engine 12 and rotating machine MG) for outputting the working fluid OIL that is used in the power transmission apparatus 16. The pump motor 62 is an electric motor exclusively serving to drive and rotate the EOP 60. The EOP 60 is to be driven and rotated by the pump motor 62 so as to output the working fluid OIL at a desired timing, for example, during stop of the vehicle 10. The working fluid OIL outputted by the MOP 58 and/or EOP 60 is supplied to the hydraulic control circuit 56. The hydraulic control circuit 56 outputs the CB hydraulic pressure Pcb, K0 hydraulic pressure Pk0 and LU hydraulic pressure Plu that have been regulated based on the working fluid OIL outputted by the MOP 58 and/or EOP 60. The working fluid OIL is supplied to the torque converter 22 so as to be used for transmitting the power, and is used for lubricating and cooling various parts of the power transmission apparatus 16. The working fluid OIL is stored in a fluid storage portion such as an oil pan, which is provided below the casing 18, and the stored working fluid OIL is pumped by the MOP 58 and/or the EOP 60 so as to be supplied to the hydraulic control circuit 56. Each of the MOP 58 and the EOP 60 is a hydraulic-pressure supply source configured to supply the hydraulic pressure to the hydraulic control circuit 56.

The vehicle 10 is provided with the electronic control apparatus 90 as a control apparatus that is configured to perform various control operations. The electronic control apparatus 90 includes a so-called microcomputer incorporating a CPU, a ROM, a RAM and an input-output interface. The CPU performs the various control operations of the vehicle 10, by processing various input signals, according to control programs stored in the ROM, while utilizing a temporary data storage function of the RAM. The electronic control apparatus 90 includes a plurality of computers such as an engine control computer, an MG control computer and a hydraulic control computer, as needed.

The electronic control apparatus 90 receives various input signals based on values detected by respective sensors provided in the vehicle 10. Specifically, the electronic control apparatus 90 receives: an output signal of an engine speed sensor 70 indicative of an engine rotational speed Ne that is a rotational speed of the engine 12; an output signal of a turbine speed sensor 72 indicative of a turbine rotational speed Nt that is equal to the AT input rotational speed Ni; an output signal of an output speed sensor 74 indicative of the AT output rotational speed No corresponding to the vehicle running speed V; an output signal of an MG speed sensor 76 indicative of the motor rotational speed Nm; an output signal of an accelerator-opening degree sensor 78 indicative of the accelerator opening degree (accelerator operation degree) θacc corresponding to an amount of operation of an acceleration operating member 79 such as an accelerator pedal and representing an acceleration amount required by the vehicle driver; an output signal of a throttle-opening degree sensor 80 indicative of a throttle opening degree θth which is an opening degree of an electronic throttle valve; an output signal of a brake switch 82 indicative of a signal representing a state in which a brake pedal is being operated by the vehicle driver so as to operate wheel brakes; an output signal of a battery sensor 84 indicative of a battery temperature THbat, a battery charging/discharging electric current Ibat and a battery voltage Vbat; an output signal of a fluid temperature sensor 86 indicative of a fluid temperature THoil that is a temperature of the working fluid OIL in the hydraulic control circuit 56; and an output signal of a lever position sensor 88 indicative of an operation position (lever position) POSsh of a shift lever 64 provided in the vehicle 10.

The shift lever 64 is disposed in vicinity of a driver seat of the vehicle 10, and is a shift operating member that is to be operated by the vehicle driver so as to switch a shift range in which the power is transmittable in the automatic transmission 24. The shift lever 64 is to be placed by the vehicle driver into one of the operation positions POSsh that include, for example, a P position, an R position, a N position and a D position. When the shift lever 64 is placed in the P position, the automatic transmission 24 is placed in a neutral state in which the transmission of the power is disconnected and a P (parking) range is selected to mechanically inhibit rotation of the transmission output shaft 26, wherein the neutral state is a state in which all of the engagement devices CB are released, for example. When the shift lever 64 is placed in the R position, an R (reverse) range is selected to establish the reverse-drive gear position in the automatic transmission 24. When the shift lever 64 is placed in the N position, the automatic transmission 24 is placed in the neutral state (as when the shift lever 64 is placed in the P position) and a N (neutral) range is selected. When the shift lever 64 is placed in the D position, a D (drive) range is selected to establish one of the plurality of forward-drive gear positions which is to be automatically selected depending on an operation state such as the vehicle running speed V and the accelerator opening degree θacc, so as to drive the vehicle 10 with the selected one of the forward-drive gear positions. The shift lever 64 may be of a position-holding type so that the shift lever 64 is held in one of the operation positions POSsh into which the shift lever 64 has been placed. However, the shift lever 64 may be an automatic return type so that the shift lever 64 is automatically returned to a predetermined home position from one of the operation positions POSsh into which the shift lever 64 has been placed. Further, the shift operating member does not necessarily have to be constituted by the shift lever 64, but may be constituted by a push-button switch or the like for selecting one of shift ranges such as the above-described P range, R range, N range and D range.

The electronic control apparatus 90 generates various output signals to the various devices provided in the vehicle 10, such as: an engine control command signal Se that is to be supplied to the engine control device 50 for controlling the engine 12, an MG control command signal Sm that is to be supplied to the inverter 52 for controlling the rotating machine MG; a CB hydraulic control command signal Scb that is to be supplied to the hydraulic control circuit 56 for controlling the operation states of the engagement devices CB; a K0 hydraulic control command signal Sk0 that is to be supplied to the hydraulic control circuit 56 for controlling the K0 clutch 20; an LU hydraulic control command signal Slu that is to be supplied to the hydraulic control circuit 56 for controlling the operation state of the LU clutch 40; and an EOP control command signal Seop that is to be supplied to the pump motor 62 for operating the EOP 60. The hydraulic control circuit 56 is provided with a plurality of solenoid valves for switching fluid passages and controlling hydraulic pressures in accordance with the CB hydraulic control command signal Scb, K0 hydraulic control command signal Sk0 and hydraulic control command signal Slu.

Figure 2:
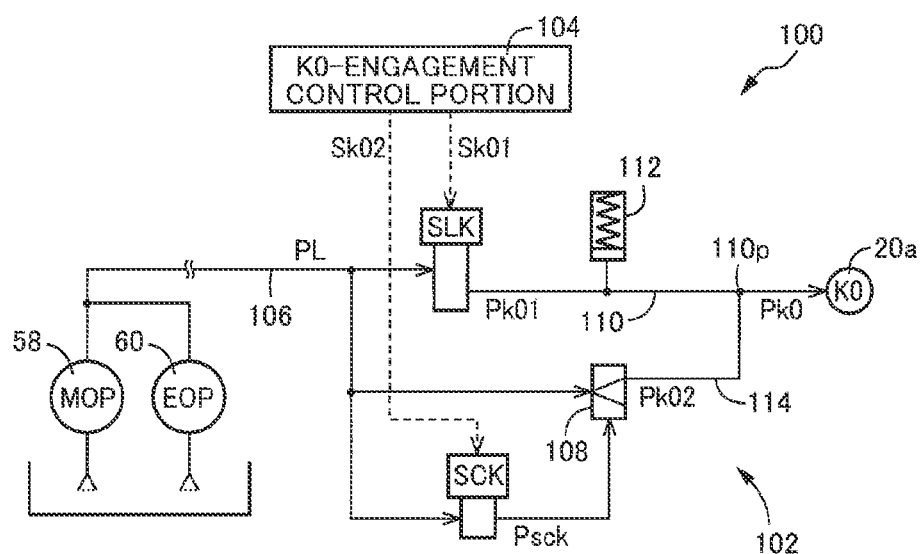
FIG. 2 is a circuit diagram for explaining the hydraulic control system for controlling an operation state of a frictional engagement device in the form of a K0 clutch that is provided in the hybrid electrically-operated vehicle shown in FIG. 1.

FIG. 2 is a circuit diagram for specifically explaining the hydraulic control system 100 for controlling a K0 hydraulic pressure Pk0 of the K0 clutch 20. The hydraulic control system 100 includes a K0-hydraulic control circuit 102 that is to be involved in a hydraulic control of the K0 clutch 20 in the hydraulic control circuit 56, and a K0-engagement control portion 104 that is functionally included in the electronic control apparatus 90 for controlling the K0 hydraulic pressure Pk0. The K0-hydraulic control circuit 102 includes a line-pressure fluid passage 106 to which a line pressure PL is to be supplied from the MOP 58 and the EOP 60 as the hydraulic-pressure supply sources, a linear solenoid valve SLK configured to receive the line pressure PL as an original pressure and to continuously regulate a first hydraulic pressure Pk01 as an output pressure, a switch valve 108 that is to be mechanically switched between an ON state (output state) in which the switch valve 108 outputs the line pressure PL as a second hydraulic pressure Pk02 and an OFF state (output stop state) in which the switch valve 108 stops outputting the second hydraulic pressure Pk02, and an ON-OFF solenoid valve SCK configured to switch the switch valve 108 between the ON and OFF states. The line pressure PL is regulated, by a line-pressure regulating device (not shown) including a linear solenoid valve, depending on a required output amount such as the accelerator opening degree θacc, and is then supplied to the line-pressure fluid passage 106. The first hydraulic pressure Pk01 outputted by the linear solenoid valve SLK is supplied to a hydraulic actuator 20a of the K0 clutch 20 via a first fluid passage 110 that is provided with a damper 112. The second hydraulic pressure Pk02 outputted by the switch valve 108 is supplied to the hydraulic actuator 20a via a second fluid passage 114 that is connected to the first fluid passage 110 at a junction 110p located between the damper 112 and the hydraulic actuator 20a first fluid passage 110. Thus, one of the first hydraulic pressure Pk01 and the second hydraulic pressure Pk02, which is higher than the other, is supplied as the K0 hydraulic pressure Pk0 to the hydraulic actuator 20a. Each of the first and second fluid passages 110, 114 is provided with a check valve or the like, as needed, such that the check valve or the like is disposed on a front side of the junction 110p.

The K0-engagement control portion 104 outputs a first command signal Sk01 and a second command signal Sk02 as the above-described K0 hydraulic control command signal Sk0. The first command signal Sk01 is outputted to control the linear solenoid valve SLK, so as to regulate the first hydraulic pressure Pk01 within a predetermined pressure-regulation control range Pslk (see FIG. 3). The second command signal Sk02 is outputted to control the ON-OFF solenoid valve SCK, so as to execute an ON-OFF switching of the ON-OFF solenoid valve SCK. In the present embodiment, the line pressure PL is directly outputted as an ON-OFF switching hydraulic pressure Psck by an ON control made to the ON-OFF solenoid valve SCK, and the switch valve 108 is placed into the ON state by the outputted ON-OFF switching hydraulic pressure Psck, whereby the line pressure PL supplied to the switch valve 108 through the line-pressure fluid passage 106 is directly outputted as the second hydraulic pressure Pk02 to the second fluid passage 114.

Figure 3:
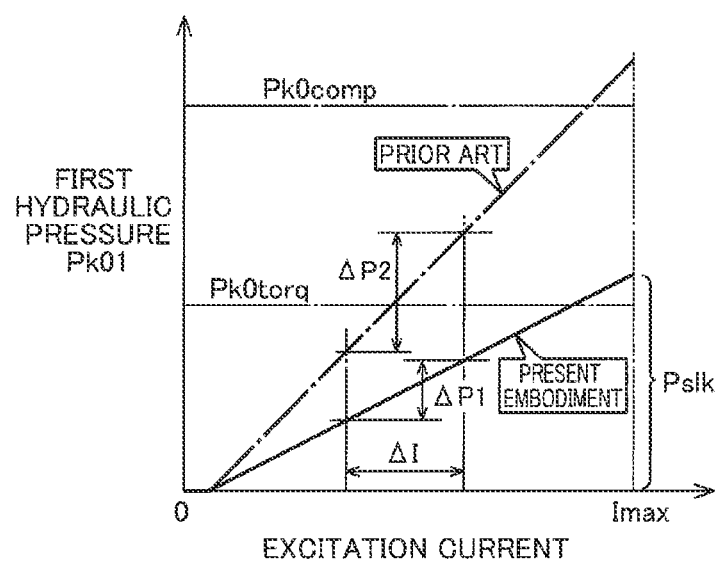
FIG. 3 is a view for explaining an output pressure characteristic of a linear solenoid valve SLK provided in the hydraulic control system of FIG. 2.

FIG. 3 is a view showing, by way of example, an output pressure characteristic of the above-described linear solenoid valve SLK, wherein one-dot chain line represents a prior art while solid line represents the present embodiment. During running of the vehicle 10, the K0 clutch 20 is required to have a relatively high toque capacity for reliably transmitting the torque Te of the engine 12. During running of the vehicle 10 with use of the engine 12 as the drive power source, a fully-engagement hydraulic pressure Pk0comp that is a high hydraulic pressure is required as the K0 hydraulic pressure Pk0. On the other hand, the K0 clutch 20 is used as a starting clutch for an engine-driving start control for causing the vehicle 10 to start to run with use of the engine 12 as the drive power source. Further, when an engine start request is present, namely, the engine 12 is requested to start during stop of the engine 12, the K0 clutch 20 is used also for a cranking control for increasing the engine rotational speed Ne by a slip engagement of the K0 clutch 20 in a state in which the rotating machine MG is driven to be rotated at a predetermined rotational speed. A control range of the K0 hydraulic pressure Pk0, which is required for the engine-driving start control and the cranking control, may be about a torque-control hydraulic pressure Pk0torq that is sufficiently lower than the above-described fully-engagement hydraulic pressure Pk0comp. In a prior art, a linear solenoid valve SLK was used, which can regulate the first hydraulic pressure Pk01 up to the fully-engagement hydraulic pressure Pk0comp, as indicated by the one-dot chain line in FIG. 3. However, in the present embodiment, the linear solenoid valve SLK is used, which can regulate the first hydraulic pressure Pk01 within the pressure-regulation control range Pslk whose upper limit is slightly higher than the torque-control hydraulic pressure Pk0torq, as indicated by the solid line in FIG. 3. That is, when the engine-driving start control or the cranking control is executed for starting the engine 12, the first hydraulic pressure Pk01, which is regulated by the linear solenoid valve SLK within the pressure-regulation control range Pslk that is a relatively low pressure range, is supplied as the K0 hydraulic pressure Pk0 to the hydraulic actuator 20a, and the K0 clutch torque Tk0 is controlled, for example, such that the MG rotational speed Nmg and the engine rotational speed Ne are increased at predetermined rates. On the other hand, during running of the vehicle 10 which requires the fully-engagement hydraulic pressure Pk0comp, the ON-OFF solenoid valve SCK is controlled such that the second hydraulic pressure Pk02 outputted by the switch valve 108 is supplied as the K0 hydraulic pressure Pk0 to the hydraulic actuator 20a, whereby the K0 clutch 20 can be engaged with a relatively high toque capacity by the second hydraulic pressure Pk02 (=PL) that is higher than the fully-engagement hydraulic pressure Pk0comp.

Thus, in the present embodiment, in the above-described engine-driving start control or cranking control, the first hydraulic pressure Pk01 is controlled by the linear solenoid valve SLK within the pressure-regulation control range Pslk that is relatively narrow, so that the first hydraulic pressure Pk01 can be controlled by the linear solenoid valve SLK with higher accuracy and higher responsiveness. That is, as shown in FIG. 3, in a case in which the first hydraulic pressure Pk01 is regulated within a range that is not higher than a maximum excitation current value Imax, the present embodiment represented by the solid line and the prior art represented by the one-dot chain line are different from each other in terms of an amount of change of the first hydraulic pressure Pk01 relative to a certain amount $\Delta I$ of change of the excitation current. The hydraulic-pressure change amount $\Delta P1$ in the present embodiment (in which a regulated control range of the first hydraulic pressure Pk01is relatively narrow) is smaller than the hydraulic-pressure change amount $\Delta P2$ in the prior art (in which the regulated control range is relatively wide), so that the first hydraulic pressure Pk01 can be regulated with higher accuracy in the present embodiment. Further, in the present embodiment, since an amount of spool displacement of the linear solenoid valve SLK, i.e., an amount of change in flow cross-sectional area of the linear solenoid valve SLK, relative to the same change of the hydraulic pressure, is larger than in the prior art, it is possible to increase responsiveness to the hydraulic pressure change.

Referring back to FIG. 1, the electronic control apparatus 90 functionally includes, in addition to the above-described K0-engagement control portion 104, a hybrid control portion 92, a shift control portion 94 and an engine-start control portion 96, for performing various controls in the vehicle 10.

The hybrid control portion 92 has a function of controlling cooperative operations of the engine 12 and the rotating machine MG, and includes an engine control portion 92a configured to control the engine 12 and an MG control portion 92b configured to control the rotating machine MG. The hybrid control portion 92 calculates the drive request amount requested to the vehicle 10 by the vehicle driver, by applying the accelerator opening degree θacc and the vehicle running speed V to a drive request amount map, for example, wherein the drive request amount is a requested drive torque Trdem that is to be applied to the drive wheels 14, for example. The hybrid control portion 92 obtains a requested input torque Tindem that is a required value of the input torque required to be inputted to the torque converter 22 for realizing the requested drive torque Trdem, for example, by taking account of various factors such as a transmission loss, an auxiliary load, the gear ratio γ of the automatic transmission 24 and a maximum chargeable amount Win and a maximum dischargeable amount Wout of the battery 54, and outputs the engine control command signal Se and the MG control command signal Smg for controlling the engine 12 and the rotating machine MG, respectively, such that the requested input torque Tindem can be obtained. The maximum chargeable amount Win and the maximum dischargeable amount Wout of the battery 54 are calculated, by the electronic control apparatus 90, based on the battery temperature THbat and a charged state value SOC [%] of the battery 54, for example. The charged state value SOC of the battery 54 is a value indicative of a charged state of the battery 54, i.e., an amount of the electric power stored or remaining in the battery 54, and is calculated by the electronic control apparatus 90, for example, based on the charging/discharging electric current Ibat and the voltage Vbat of the battery 54.

When the requested input torque Tindem can be covered by only the output of the rotating machine MG, the hybrid control portion 92 establishes a BEV (Battery Electric Vehicle) driving mode as a motor driving mode for causing the vehicle 10 to run by driving the rotating machine MG with only the electric power supplied from the battery 54. In the BEV driving mode, a BEV driving is performed to drive the vehicle 10 by using only the rotating machine MG as the drive power source while stopping the engine 12 with the K0 clutch 20 being placed in the released state. In the BEV driving mode, the MG torque Tmg is controlled such that the requested input torque Tindem is realized. When the requested input torque Tindem cannot be covered without using at least the output of the engine 12, the hybrid control portion 92 establishes an HEV (Hybrid Electric Vehicle) driving mode as an engine driving mode for causing the vehicle 10 to run by using at least the engine 12 as the drive power source while placing the K0 clutch 20 in the engaged state. In the HEV driving mode, the engine torque Te is controlled to realize all or a part of the requested input torque Tindem by the engine torque Te, and the MG torque Tmg is also controlled to compensate an insufficiency of the engine torque Te to the requested input torque Tindem, as needed. On the other hand, even when the requested input torque Tindem can be covered by only the output of the rotating machine MG, the hybrid control portion 92 establishes the HEV driving mode, for example, in a case in which the engine 12 or other parts of the power transmission apparatus 16 is required to be warmed up. Thus, the hybrid control portion 92 is configured, during the HEV driving, to automatically stop the engine 12 and to restart the engine 12 after having stopped the engine 12, and is configured, during the BEV driving, to start the engine 12 and to automatically stop and start the engine 12 when the vehicle 10 is being stopped. Thus, the hybrid control portion 92 switches between the BEV driving mode and the HEV driving mode, depending on the requested input torque Tindem or the like.

The shift control portion 94 is configured, when the D range is selected, to determine whether a shifting action is required or not in the automatic transmission 24, by using a shifting map or the like that is predetermined with variables (relating to an operation state of the vehicle 10) such as the vehicle running speed V and the accelerator opening degree θacc, and to execute an automatic shift control for outputting the CB hydraulic control command signal Sc, as needed, by which a currently established one of the forward-drive gear positions is to be automatically switched to another one of the forward-drive gear positions in the automatic transmission 24, such that the outputted CB hydraulic control command signal Scb is supplied to the hydraulic control circuit 56. Further, when the shift lever 64 or other manual-shift operating member disposed in vicinity of the driver seat of the vehicle 10 is operated by the vehicle driver and a shift command signal is supplied to the shift control portion 94, the shift control portion 94 is configured to execute a manual shift control by which a currently established one of the forward-drive gear positions is to be switched to another one of the forward-drive gear positions in the automatic transmission 24, in accordance with the shift command signal.

When the engine start request is issued by, for example, operation of the shift lever 64 or the acceleration operating member 79, the engine-start control portion 96 is configured to start the engine 12 in accordance with the engine start request. When the engine rotational speed Ne has being increased by cranking of the engine 12 with use of the starter 12s or the rotating machine MG and has reached a predetermined startable speed value, an engine start processing such as fuel injection and ignition is executed to start the engine 12 and to cause the engine 12 to be self-rotated.

Figure 4:
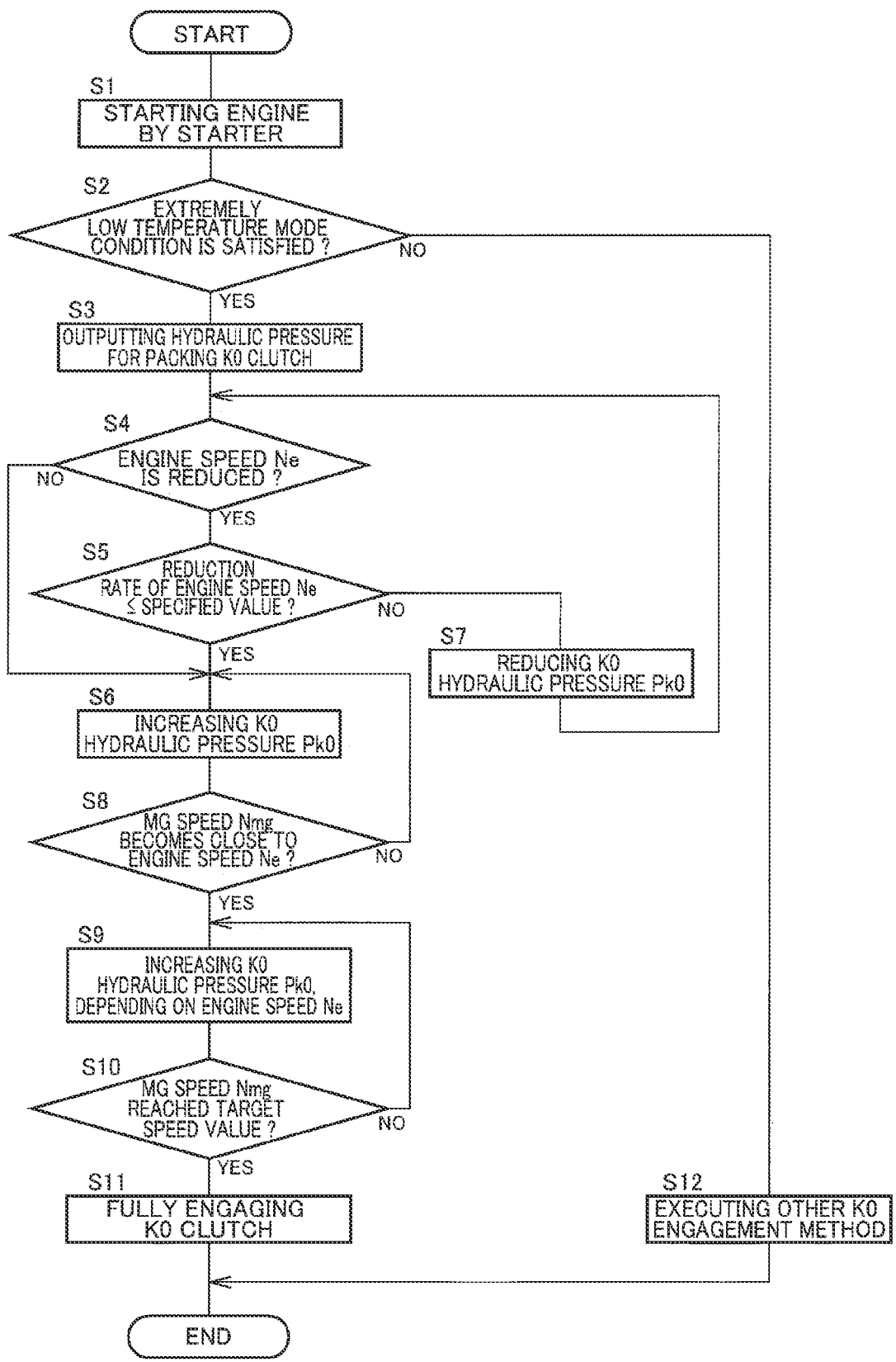
FIG. 4 is a flow chart for explaining operations executed in the hybrid electrically-operated vehicle of FIG. 1, for engaging the K0 clutch after start of an engine, for example, when the vehicle is to start running.
Figure 5:
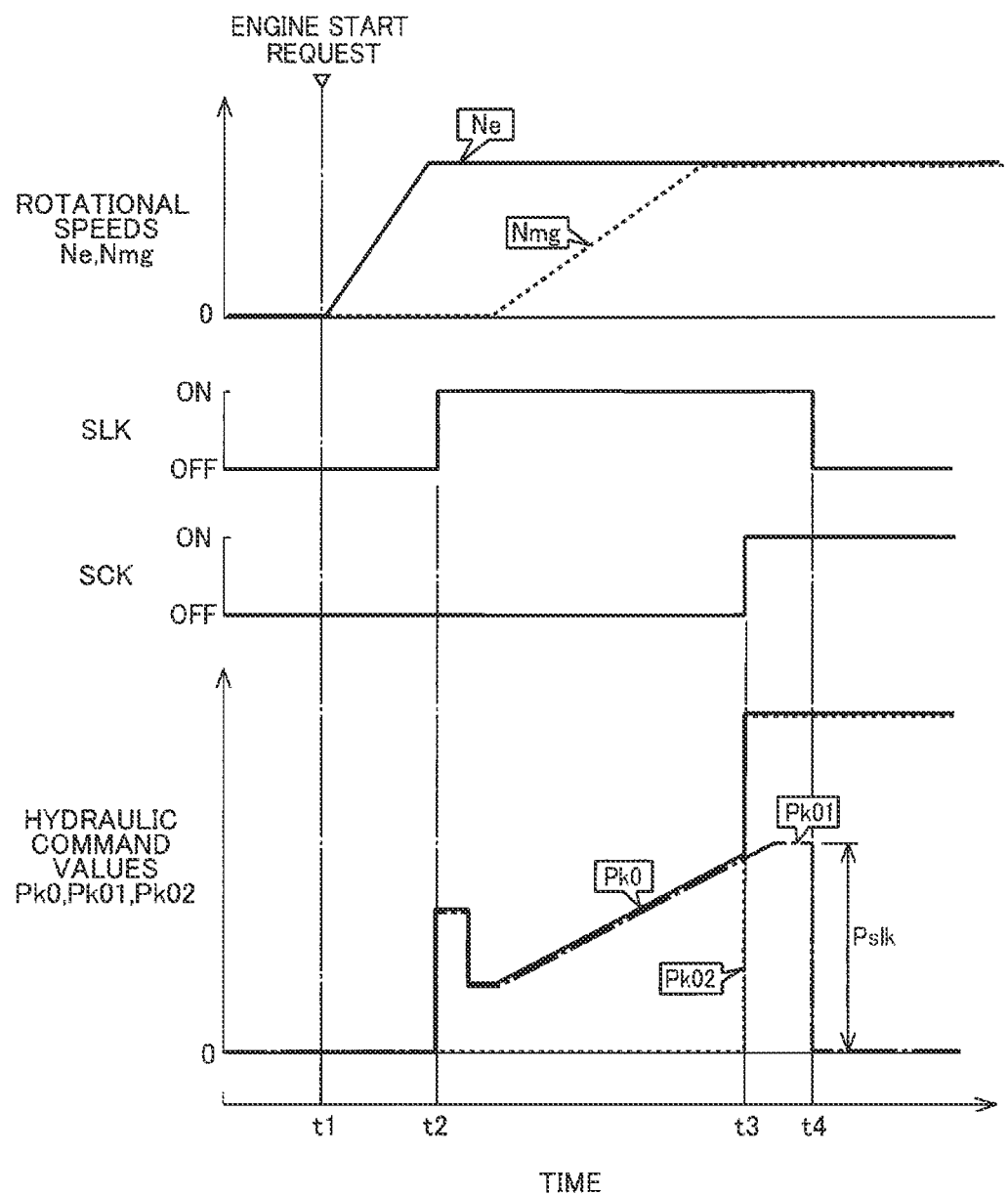
FIG. 5 is an example of time chart showing changes of operation states of respective parts in a case in which an engagement control of the K0 clutch is executed in accordance with the flow chart of FIG. 4.

The K0-engagement control portion 104 is configured, when the engine-driving start control or engine start control is executed, to control the K0 hydraulic pressure Pk0, i.e., the engaging torque Tk0 of the K0 clutch 20, and is configured, when the vehicle 10 runs with use of the engine 12 as the drive power source, to cause the K0 clutch 20 to be fully engaged with a large engaging torque capacity. FIG. 4 is a flow chart showing a control routine executed by the K0-engagement control portion 104 to engage the K0 clutch 20, for thereby starting the vehicle 10 to run or generating a creep torque after start of the engine 12 by the starter 12s. The control routine includes steps S1 to S12 at each of which signal processing executed. It is noted that, in the flow chart of FIG. 4, "YES" and "NO" in each of determination steps S2, S4, S5, S8 and S10 (represented by rhombus shapes) represent affirmative determination and negative determination, respectively. FIG. 5 is an example of time chart showing changes of operation states of respective parts in a case in which an engagement control of the K0 clutch is executed in accordance with the flow chart of FIG. 4.

As shown in FIG. 4, the control flow is initiated with step S1 that is implemented by the engine-start control portion 96 to start the engine 12, by cranking the engine 12 by the starter 12s and executing the engine start processing such as the fuel injection. In FIG. 5, a time point t1 represents a point of time at which the cranking of the engine 12 is initiated by the starter 12s in accordance with the engine start request. Step S2 and the subsequent steps are implemented by the K0-engagement control portion 104. At step S2, it is determined whether a predetermined extremely low temperature mode condition is satisfied or not. The extremely low temperature mode condition is satisfied, for example, when the fluid temperature THoil is so low that the working fluid has a high viscosity so that an engagement shock is likely to be caused in a normal engagement control. When the extremely low temperature mode condition is satisfied, step S2 is followed by step S3 and the subsequent steps. When the extremely low temperature mode condition is not satisfied, the control flow goes to step S12 that is implemented to execute another K0 engagement method, namely, execute the normal engagement control in which the K0 clutch 20 is engaged through a feedforward control or a feedback control, for example.

Step S3 is implemented to output the K0 hydraulic pressure Pk0 for packing the hydraulic actuator 20a of the K0 clutch 20, and to quickly fill hydraulic actuator 20a with the K0 hydraulic pressure Pk0 until shortly before the engagement of the K0 clutch 20. At this step S3, the first command signal Sk01 is outputted to the linear solenoid valve SLK, and the first hydraulic pressure Pk01 outputted from the linear solenoid valve SLK is supplied as the K0 hydraulic pressure Pk0 to the hydraulic actuator 20a. In FIG. 5, a time point t2 represents a point of time at which the packing of step S3 is initiated, and one-dot chain line and solid line represent the first hydraulic pressure Pk01 and the K0 hydraulic pressure Pk0, respectively, in column of "HYDRAULIC COMMAND VALUES". Step S4 is implemented to determine whether the engine rotational speed Ne has been reduced, due to the slip engagement of the K0 clutch 20, for example, from an idle rotational speed Neidle, or not. When the engine rotational speed Ne has been reduced, step S4 is followed by step S5. When the engine rotational speed Ne has not been reduced, step S4 is followed by step S6. Step S5 is implemented to determine whether a rate of the reduction of the engine rotational speed Ne is equal to or lower than a specified value, namely, whether an absolute value of the reduction rate is small or not. When the reduction rate of the engine rotational speed Ne is equal to or lower than the specified value, step S5 is followed by step S6. When the reduction rate of the engine rotational speed Ne is higher than the specified value, namely, when the absolute value of the reduction rate is large, step S5 is followed by step S7 at which the K0 hydraulic pressure Pk0 is reduced by a predetermined pressure value by controlling the linear solenoid valve SLK through the first command signal Sk01. After the K0 hydraulic pressure Pk0 has been reduced by the predetermined pressure value, the control flow goes back to step S4. Then, when the reduction of the engine rotational speed Ne has become substantially zero or the reduction rate of the engine rotational speed Ne has become equal to or lower than the specified value, step S6 is implemented.

Step S6 is implemented to control the linear solenoid valve SLK through the first command signal Sk01 such that the K0 hydraulic pressure Pk0 is increased by a predetermined pressure value. Step S6 is followed by step S8 that is implemented to determine whether the MG rotational speed Nmg is increased to become close to the engine rotational speed Ne, or not. Until the MG rotational speed Nmg is increased to become close to the engine rotational speed Ne, step S6 is repeatedly implemented to gradually increase the K0 hydraulic pressure Pk0. When the MG rotational speed Nmg has become increased, namely, when an affirmative determination (YES) is made at step S8, step S9 is implemented to control the linear solenoid valve SLK through the first command signal Sk01 by seeing the engine rotational speed Ne, namely, depending on the engine rotational speed Ne. That is, at step S9, the K0 hydraulic pressure Pk0 is gradually increased such that the engine rotational speed Ne is kept substantially at the idle rotational speed Neidle, for example. In the above-described steps S6, S7 and S9, the control of the K0 hydraulic pressure Pk0, i.e., the regulation control of the first hydraulic pressure Pk01 through the linear solenoid valve SLK, is made within the pressure-regulation control range Pslk.

Step S10 is implemented to determine whether the MG rotational speed Nmg has reached a predetermined target speed value or not. Step S9 is repeatedly implemented until the MG rotational speed Nmg has reached the target speed value. The target speed value is, for example, a rotational speed that is substantially coincident with the engine rotational speed Ne such that the K0 clutch 20 is engaged without slipping, namely, such that the engagement shock is not caused even if the K0 clutch 20 is fully engaged with the second hydraulic pressure Pk02 (=PL), which is relatively high, being supplied to the hydraulic actuator 20a. Then, when the MG rotational speed Nmg has reached the target speed value, namely, when an affirmative determination (YES) is made at step S10, step S11 is implemented to cause the K0 clutch 20 to be fully engaged. Specifically, the switch valve 108 is placed into the ON state with the second command signal Sk02 being outputted to the ON-OFF solenoid valve SCK, so that the second hydraulic pressure Pk02 is supplied as the K0 hydraulic pressure Pk0 to the hydraulic actuator 20a, whereby the K0 clutch 20 is fully engaged with a large torque capacity by the second hydraulic pressure Pk02 (=PL) that is higher than the fully-engagement hydraulic pressure Pk0comp. In FIG. 5, a time point t3 is a point of time at which the K0 clutch 20 is fully engaged with the high second hydraulic pressure Pk02 that is represented by broken line in column of "HYDRAULIC COMMAND VALUES", by implementation of step S11. Thus, once the K0 clutch 20 is fully engaged based on the second hydraulic pressure Pk02, the first hydraulic pressure Pk01 is no longer required. Therefore, at a time point t4, the output of the first command signal Sk01 to the linear solenoid valve SLK is stopped whereby the first hydraulic pressure Pk01 is zeroed. Since the responsiveness of the second hydraulic pressure Pk02 outputted from the switch valve 108 is high, it is also possible to stop the output of the first command signal Sk01 concurrently with the output of the second command signal Sk02 at the time point t3.

On the other hand, in a case in which the engine 12 is to be started by cranking by the rotating machine MG, the K0-engagement control portion 104 and the engine-start control portion 96 cooperate with each other to execute the engine start control for staring the engine 12. That is, the cranking control is executed by the K0-engagement control portion 104 to crank the engine 12 through a slip control of the K0 clutch 20, and the engine start processing such as the fuel injection and ignition is executed to start the engine 12 and to cause the engine 12 to be self-rotated, when the engine rotational speed Ne has reached the predetermined startable speed value. Specifically, for example, as shown in a time chart of FIG. 6, at a time point t1 at which the engine start request is issued, the first command signal Sk01 is outputted as the K0 hydraulic control command signal Sk0 to the linear solenoid valve SLK, and the first hydraulic pressure Pk01 (represented by one-dot chain line in FIG. 6) outputted from the linear solenoid valve SLK is supplied as the K0 hydraulic pressure Pk0 (represented by solid line in FIG. 6) to the hydraulic actuator 20a. The first hydraulic pressure Pk01 is regulated within the pressure-regulation control range Pslk, such that the engine rotational speed Ne is increased at a predetermined rate by the slip engagement of the K0 clutch 20 through the first hydraulic pressure Pk01. At a time point t2, it is determined through an engine start flag or the like that the engine 12 has been placed in a complete explosion state (in which the engine 12 is self-rotated) by the engine start processing such as fuel injection and ignition. Then, the engine rotational speed Ne becomes coincident with the MG rotational speed Nmg at a time point t3, and the second command signal Sk02 is supplied as the K0 hydraulic control command signal Sk0 to the ON-OFF solenoid valve SCK at a time point t4 at which the K0 clutch 20 becomes engaged without slipping by control of the first hydraulic pressure Pk01, for example. Thus, the switch valve 108 is placed into the ON state whereby the second hydraulic pressure Pk02 (broken line) is supplied as the K0 hydraulic pressure Pk0 to the hydraulic actuator 20a, so that the K0 clutch 20 is fully engaged with a large torque capacity by the second hydraulic pressure Pk02 (=PL) that is higher than the fully-engagement hydraulic pressure Pk0comp. In this state in which the K0 clutch 20 is fully engaged, the first hydraulic pressure Pk01 is no not required, so that the output of the first command signal Sk01 to the linear solenoid valve SLK is stopped whereby the first hydraulic pressure Pk01 is zeroed at a time point t5. Since the responsiveness of the second hydraulic pressure Pk02 outputted from the switch valve 108 is high, it is also possible to stop the output of the first command signal Sk01 concurrently with the output of the second command signal Sk02 at the time point t4.

As described above, in the hydraulic control system 100 according to the present embodiment, the K0 clutch torque Tk0 is continuously changed with the first hydraulic pressure Pk01 supplied to the K0 clutch 20 being regulated by the linear solenoid valve SLK, and the K0 clutch 20 is placed in the fully engaged state with the high engaging torque Tk0 when the second hydraulic pressure Pk02 (=PL) is supplied to the K0 clutch 20 through the ON-OFF switching of the ON-OFF solenoid valve SCK. Thus, it is sufficient that the linear solenoid valve SLK is capable of regulating the first hydraulic pressure Pk01 within the predetermined pressure-regulation control range Pslk that is lower than the second hydraulic pressure Pk02. That is, it is possible to narrower the control range within which the first hydraulic pressure Pk01 is to be controlled by the linear solenoid valve SLK, and accordingly to increase control accuracy and responsiveness of the linear solenoid valve SLK. Therefore, it is possible to cause the second hydraulic pressure Pk02 to provide a large torque capacity required when the K0 clutch 20 is fully engaged, and to control the engaging torque of the K0 clutch 20 with high accuracy and responsiveness by regulation of the first hydraulic pressure Pk01 through the linear solenoid valve SLK when the engaging torque needs to be finely controlled in a slip engagement region for the vehicle running-start control and the engine start control, for example. Further, since the control can be made by merely cooperation of the linear solenoid valve SLK and the ON-OFF solenoid valve SCK, the hydraulic control system 100 as a whole can be constructed at a low cost.

In the present embodiment, the engagement control is executed for placing the K0 clutch 20 in the engaged state with or without slipping of the K0 clutch 20, by causing the first hydraulic pressure Pk01 supplied to the hydraulic actuator 20a of the K0 clutch 20, to be regulated by the linear solenoid valve SLK, and the K0 clutch 20 is placed in the fully engaged state, by supplying the second hydraulic pressure Pk02 to the hydraulic actuator 20a of the K0 clutch 20 through the ON-OFF switching of the ON-OFF solenoid valve SCK in the state (at the time point t3 in FIG. 5 and at the time point t4 in FIG. 6) in which the K0 clutch 20 is engaged based on the first hydraulic pressure Pk01 without the slipping of the K0 clutch 20. Thus, it is possible to smoothly switch the K0 clutch 20 from the slipping engaged state established by the first hydraulic pressure Pk01 to the fully engaged state established by the second hydraulic pressure Pk02, while suppressing an engagement shock or the like.

In the present embodiment, the switch valve 108 is provided to be switched, depending on presence or absence of ON-OFF switching hydraulic pressure Psck outputted by the ON-OFF solenoid valve SCK, between the output state in which the switch valve 108 outputs the second hydraulic pressure Pk02 and the output stop state in which the switch valve 108 stops outputting the second hydraulic pressure Pk02. Thus, it is possible to obtain a sufficient amount of working fluid having the second hydraulic pressure Pk02 and to place the K0 clutch 20 into the fully engaged state with high responsiveness.

The present embodiment relates to the hydraulic control system 100 for the K0 clutch 20 disposed between the engine 12 and the rotating machine MG. The large torque capacity is provided by the second hydraulic pressure Pk02 when the K0 clutch 20 is fully engaged, and the engaging torque of the K0 clutch 20 can be controlled with high accuracy and responsiveness by regulation of the first hydraulic pressure Pk01 through the linear solenoid valve SLK when the engaging torque Tk0 needs to be finely controlled, for example, in the slip engagement region. Thus, it is possible to assure the large torque capacity required to transmit a large drive power during running of the vehicle 10, and to appropriately control the torque capacity for transmitting the torque between the engine 12 and the rotating machine MG, for example, upon start of running of the vehicle 10 by the engine 12 and upon start of the engine 12 by the rotating machine MG.

Figure 6:
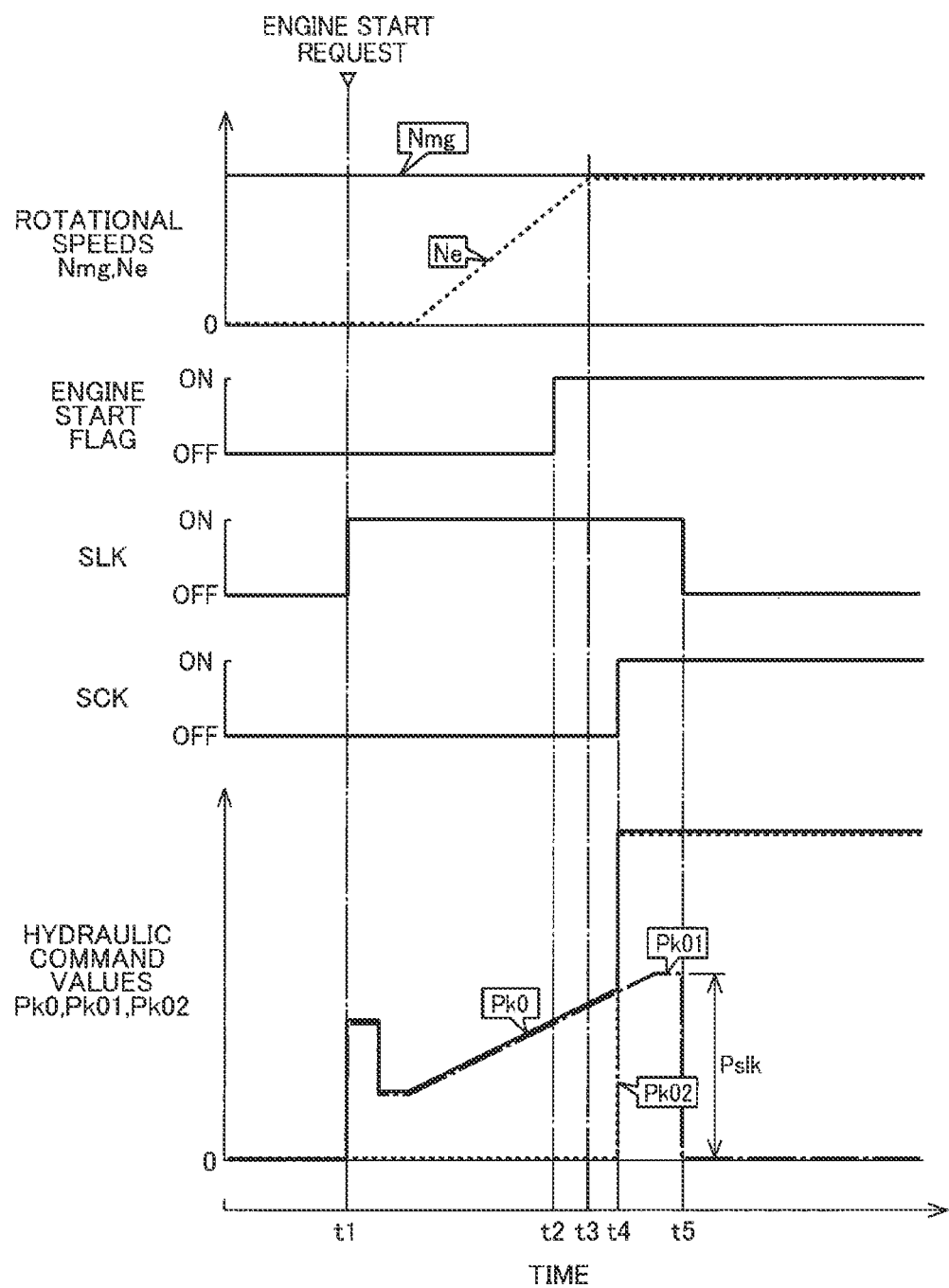
FIG. 6 is an example of time chart showing changes of operation states of respective parts in a case in which the engine is cranked by a rotating machine through engagement of the K0 clutch.

In the engine start control owing to the rotating machine MG, which is shown in FIG. 6, the first hydraulic pressure Pk01 is supplied to the hydraulic actuator 20a of the K0 clutch 20 in a state in which the rotating machine MG is driven to be rotated, and the first hydraulic pressure Pk01 is regulated by the linear solenoid valve SLK such that the engine 12 is cranked through the slip engagement of the K0 clutch 20 which is based on the first hydraulic pressure Pk01. Further, after the engine 12 has been started to be placed in the complete explosion state by the predetermined engine start processing, the K0 clutch 20 is fully engaged with the second hydraulic pressure Pk02 being supplied to the hydraulic actuator 20a of the K0 clutch 20 through the ON-OFF switching of the ON-OFF solenoid valve SCK. Therefore, it is sufficient that the linear solenoid valve SLK, which is operated to control the slipping engaged state of the K0 clutch 20 upon cranking of the engine 12, is capable of regulating the first hydraulic pressure Pk01 within the pressure-regulation control range Pslk which is lower than the second hydraulic pressure Pk02 and which does not have to be wide and may be narrow. Thus, the engaging torque Tk0 of the K0 clutch 20 upon cranking of the engine 12 is controlled by the linear solenoid valve SLK with high accuracy and high responsiveness, so that it is possible to start the engine 12 by appropriately cranking the engine 12. Further, in the complete explosion state of the engine 12, the K0 clutch 20 is placed in the fully engaged state with the large torque capacity based on the second hydraulic pressure Pk02, so that the large engine torque Te can be reliably transmitted through the K0 clutch 20 during running of the vehicle 10.

In the engine-driving start control shown in FIGS. 4 and 5, during normal running of the vehicle 10 after start of the running, the K0 clutch 20 is placed in the fully engaged state with the second hydraulic pressure Pk02 (that is a high hydraulic pressure) being supplied to the K0 clutch 20 by the ON-OFF switching of the ON-OFF solenoid valve SCK. Therefore, it is sufficient that the linear solenoid valve SLK, which is operated to control the slipping engaged state of the K0 clutch 20 upon start of the vehicle 10, is capable of regulating the first hydraulic pressure Pk01 within the pressure-regulation control range Pslk which is lower than the second hydraulic pressure Pk02 and which does not have to be wide and may be narrow. Thus, the engaging torque Tk0 of the K0 clutch 20, which is to be in the slip engagement upon start of running of the vehicle 10, is controlled by the linear solenoid valve SLK with high accuracy and high responsiveness, so that it is possible to smoothly start the vehicle 10 to run even at an extremely low temperature that increases the viscosity of the working fluid.

There will be described other embodiments of this disclosure. The same reference signs as used in the above-described embodiment will be used in the following embodiment, to identify the practically corresponding elements, and descriptions thereof are not provided.

Figure 7:
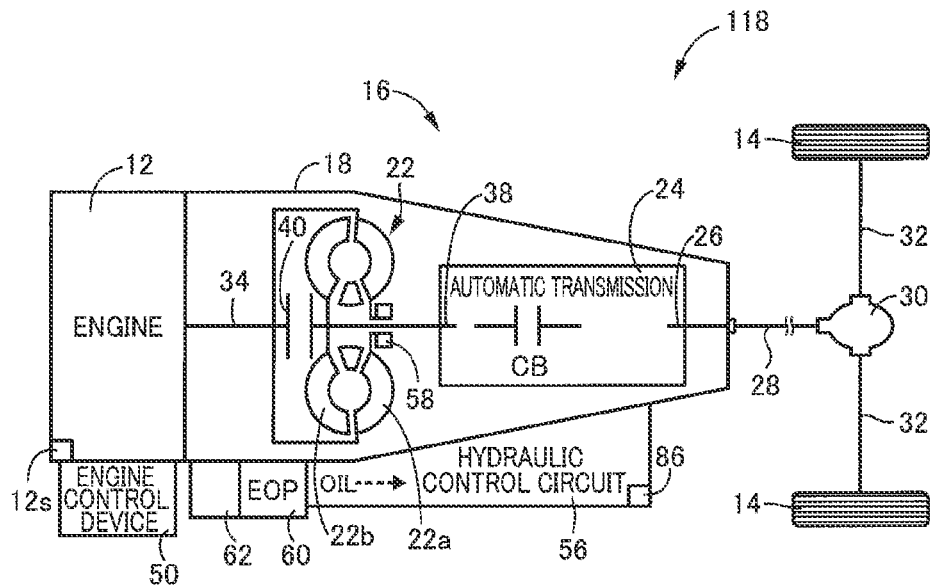
FIG. 7 is a view schematically showing a construction of a drive system of an engine drive vehicle (without a rotating machine) including a hydraulic control system as another embodiment of the present disclosure.

FIG. 7 shows an engine drive vehicle in the form of a vehicle 118 that is different from the above-described vehicle 10 in that the rotating machine MG is not provided. The vehicle 118, in which the engine connection shaft 34 is connected to the pump impeller 22a of the torque converter 22, is provided with a hydraulic control system 120 (see FIG. 8) according to another embodiment of the present disclosure, which is for controlling the LU hydraulic pressure Plu of the LU clutch 40. The vehicle 118 is substantially the same in construction as the above-described vehicle 10 except for absence of the rotating machine MG, and includes the electronic control apparatus 90 as a control apparatus as the above-described vehicle 10. In the present embodiment, the LU clutch 40 corresponds to the hydraulically-operated frictional engagement device that is subjected to control executed by the hydraulic control system 120.

Figure 8:
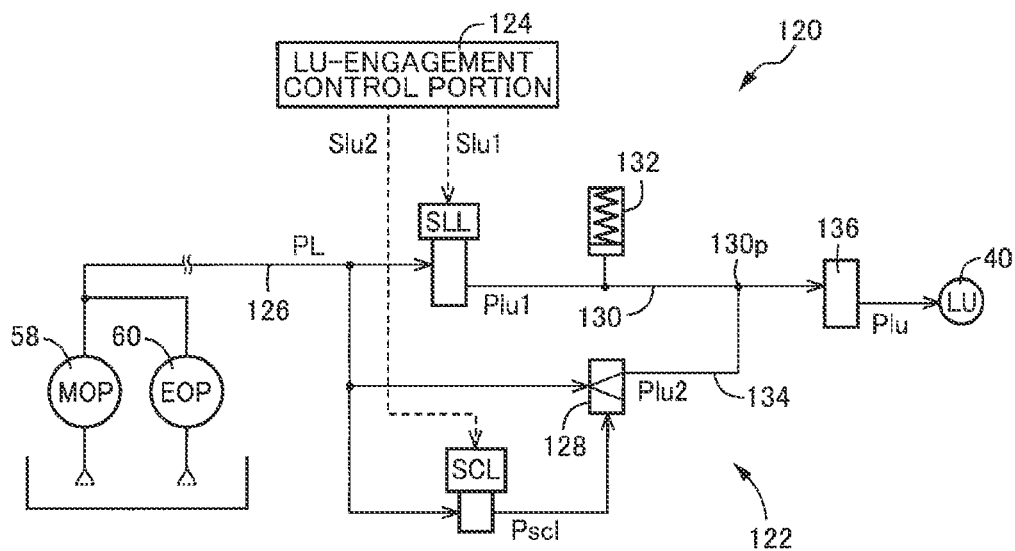
FIG. 8 is a circuit diagram for explaining the hydraulic control system for controlling an operation state of a frictional engagement device in the form of an LU clutch that is provided in the engine drive vehicle shown in FIG. 7.

As shown in FIG. 8, the hydraulic control system 120 includes an LU-hydraulic control circuit 122 that is to be involved in a hydraulic control of the LU clutch 40, and an LU-engagement control portion 124 that is functionally included in the electronic control apparatus 90 for controlling the LU hydraulic pressure Plu. The LU-hydraulic control circuit 122 includes a line-pressure fluid passage 126 to which the line pressure PL is to be supplied from the MOP 58 and the EOP 60 as the hydraulic-pressure supply sources, a linear solenoid valve SLL configured to receive the line pressure PL as an original pressure and to continuously regulate a first hydraulic pressure Plu1 as an output pressure, a switch valve 128 that is to be mechanically switched between an ON state (output state) in which the switch valve 128 outputs the line pressure PL as a second hydraulic pressure Plu2 and an OFF state (output stop state) in which the switch valve 128 stops outputting the second hydraulic pressure Plu2, and an ON-OFF solenoid valve SCL configured to switch the switch valve 128 between the ON and OFF states. The first hydraulic pressure Plu1 outputted by the linear solenoid valve SLL is supplied as the LU hydraulic pressure Plu to the LU clutch 40 via a first fluid passage 130 and an LU control valve 136, wherein the first fluid passage 130 is provided with a damper 132. The second hydraulic pressure Plu2 outputted by the switch valve 128 is supplied as the LU hydraulic pressure Plu to the LU clutch 40 via a second fluid passage 134 and the LU control valve 136, wherein the second fluid passage 134 is connected to the first fluid passage 130 at a junction 130*p* located between the damper 132 and the LU control valve 136 in the first fluid passage 130. Thus, one of the first hydraulic pressure Plu1 and the second hydraulic pressure Plu2, which is higher than the other, is supplied as the LU hydraulic pressure Plu to the LU clutch 40, so that the LU clutch torque Tlu, i.e., the operation state of the LU clutch 40 is controlled depending on the supplied LU hydraulic pressure Plu. Each of the first and second fluid passages 130, 134 is provided with a check valve or the like, as needed, such that the check valve or the like is disposed on a front side of the junction 130*p*.

The LU-engagement control portion 124 outputs a first command signal Slu1 and a second command signal Slu2 as the above-described LU hydraulic control command signal Slu. The first command signal Slu1 is outputted to control the linear solenoid valve SLL, so as to regulate the first hydraulic pressure Plu1 within a predetermined pressure-regulation control range Psll (see FIG. 10) that is a relatively low pressure range. The second command signal Slu2 is outputted to control the ON-OFF solenoid valve SCL, so as to execute an ON-OFF switching of the ON-OFF solenoid valve SCL. In the present embodiment, the line pressure PL is directly outputted as an ON-OFF switching hydraulic pressure Pscl by an ON control made to the ON-OFF solenoid valve SCL, and the switch valve 128 is placed into the ON state by the outputted ON-OFF switching hydraulic pressure Pscl, whereby the line pressure PL supplied to the switch valve 128 through the line-pressure fluid passage 126 is directly outputted as the second hydraulic pressure Plu2 to the second fluid passage 134. As is clear from FIG. 10, the second hydraulic pressure Plu2 is a hydraulic pressure which is even higher than the highest pressure value of the pressure-regulation control range Psll of the first hydraulic pressure Plu1, and which enables the LU clutch 40 to reliably transmit a large drive power without slipping of the LU clutch 40 during running of the vehicle 118. In the present embodiment, the second hydraulic pressure Plu2 corresponds to the line pressure PL.

Figure 9:
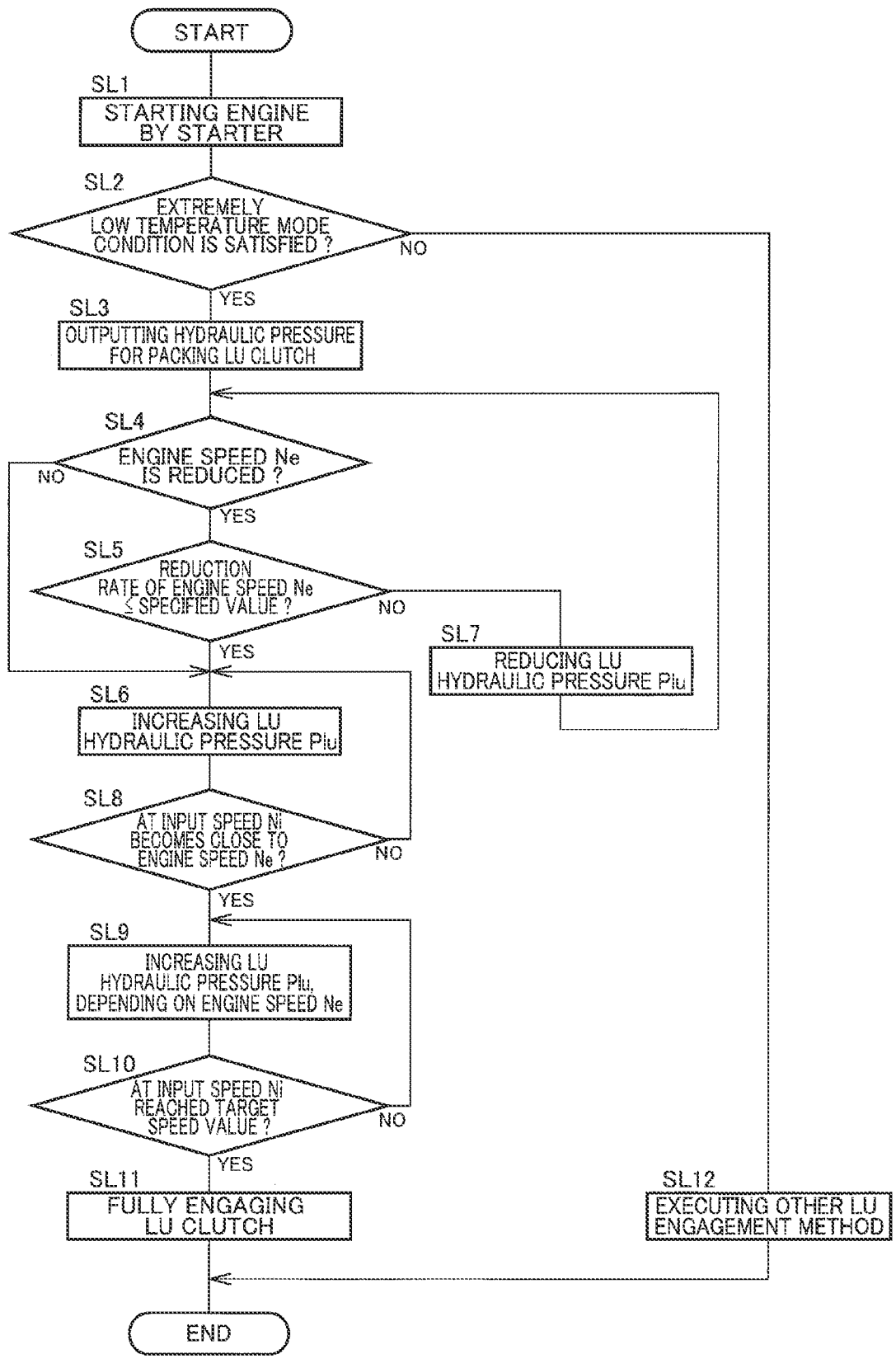
FIG. 9 is a flow chart for explaining operations executed in the engine drive vehicle of FIG. 7, for engaging the LU clutch after start of an engine, for example, when the vehicle is to start running.
Figure 10:
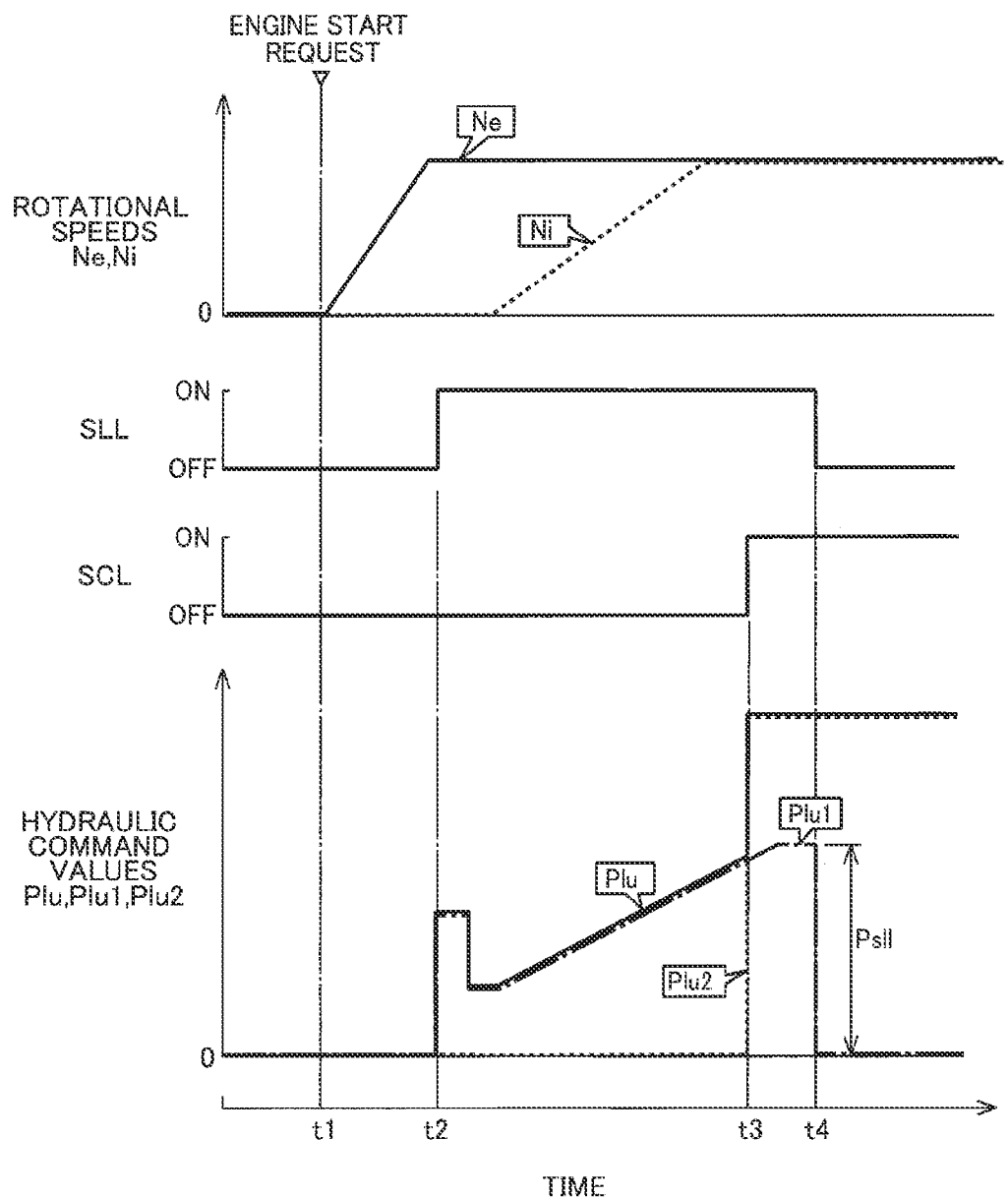
FIG. 10 is an example of time chart showing changes of operation states of respective parts in a case in which an engagement control of the LU clutch is executed in accordance with the flow chart of FIG. 9.

The LU-engagement control portion 124 is configured, when the vehicle 118 starts to run, for example, to control the LU hydraulic pressure Plu, i.e., the engaging torque Tlu of the LU clutch 40, and is configured, when the vehicle 118 is running, to cause the LU clutch 40 to be fully engaged with a large torque capacity. FIG. 9 is a flow chart for showing a control routine executed by the LU-engagement control portion 124 for engaging the LU clutch 40 after start of the engine 12 by the starter 12*s*, so as to start the vehicle 10 to run. FIG. 10 is an example of time chart showing changes of operation states of respective parts in a case in which the engagement control of the LU clutch 40 is executed in accordance with the flow chart of FIG. 9. The control routine shown in the flow chart of FIG. 9 is substantially the same as the control routine shown in the flow chart of FIG. 4, which is executed in the engagement control of the K0 clutch 20 upon start of the engine 12 in the above-described embodiment. Further, the time chart of FIG. 10 is substantially the same as that of FIG. 5, only except for increase of the AT input rotational speed Ni by the slip engagement control of the LU clutch 40, in place of increase of the MG rotational speed Nmg by the slip engagement control of the K0 clutch 20 upon start of running of the vehicle.

In the vehicle running-start control shown in FIGS. 9 and 10, during normal running of the vehicle 118 after start of the running, the LU clutch 40 is placed in the fully engaged state with the second hydraulic pressure Plu2 (that is a high hydraulic pressure) being supplied to the LU clutch 40 by the ON-OFF switching of the ON-OFF solenoid valve SCL. Therefore, it is sufficient that the linear solenoid valve SLL, which is operated to control the slipping engaged state of the LU clutch 40 upon start of the vehicle 118, is capable of regulating the first hydraulic pressure Plu1 within the pressure-regulation control range Psll which is lower than the second hydraulic pressure Plu2 and which does not have to be wide and may be narrow. Thus, the engaging torque Tlu of the LU clutch 40, which is to be in the slip engagement upon start of running of the vehicle 118, is controlled by the linear solenoid valve SLL with high accuracy and high responsiveness, so that it is possible to smoothly start the vehicle 118 to run even at an extremely low temperature that increases the viscosity of the working fluid.

Thus, in the hydraulic control system 120 according to the present embodiment, too, the large torque capacity is provided by the second hydraulic pressure Plu2 when the LU clutch 40 is fully engaged, and the engaging torque of the LU clutch 40 can be controlled with high accuracy and responsiveness by regulation of the first hydraulic pressure Plu1 through the linear solenoid valve SLL when the engaging torque Tlu needs to be finely controlled, for example, in the slip engagement region (at steps SL3 through SL10 in the control routine shown in FIG. 9). Thus, it is possible to assure the large torque capacity required to transmit a large drive power during running of the vehicle 118, and to appropriately control the slip engaging torque Tlu of the LU clutch 40 upon start of running of the vehicle 118 by the engine 12, for example. Further, since the control can be made by merely cooperation of the linear solenoid valve SLL and the ON-OFF solenoid valve SCL, the hydraulic control system 120 as a whole can be constructed at a low cost. Thus, the present embodiment provides substantially the same effects as the above-described embodiment.

Figure 11:
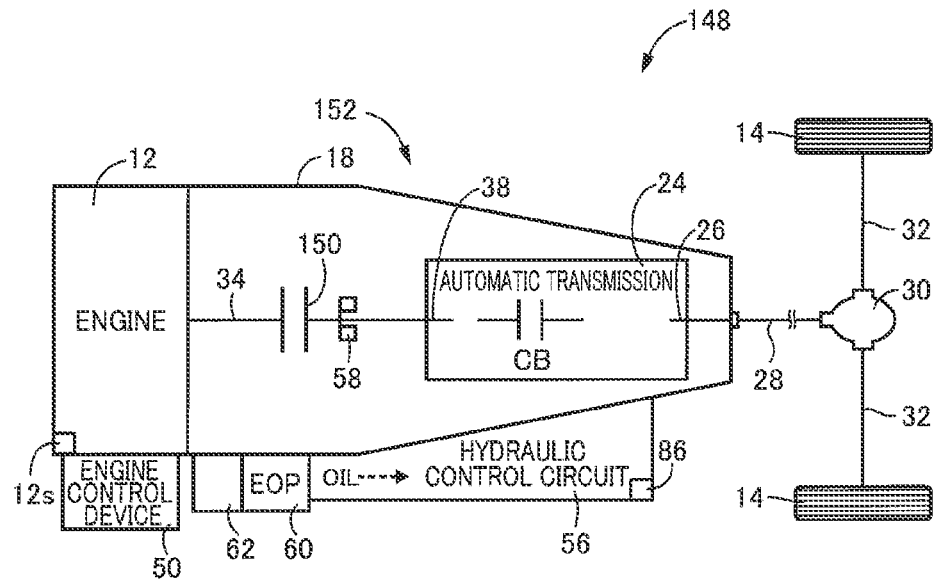
FIG. 11 is a view schematically showing a construction of a drive system of an engine drive vehicle including a hydraulic control system as still another embodiment of the present disclosure.

FIG. 11 shows an engine drive vehicle in the form of a vehicle 148 that is different from the above-described vehicle 118 of FIG. 7 in that a starting clutch in the form of a C0 clutch 150 is provided in place of the torque converter 22. The vehicle 148 is provided with a hydraulic control system 160 (see FIG. 12) according to still another embodiment of the present disclosure, which is for controlling a C0 hydraulic pressure Pc0 of the C0 clutch 150. The vehicle 148 is substantially the same in construction as the above-described vehicle 10 except for provision of the C0 clutch 150 in place of the rotating machine MG and the torque converter 22, and includes the electronic control apparatus 90 as a control apparatus as the above-described vehicle 10. The vehicle 148 includes a power transmission apparatus 152 that is constituted mainly by the automatic transmission 24 and the C0 clutch 150. Although the MOP 58 is provided in the transmission input shaft 38 as shown in FIG. 11, it is also possible to provide the MOP 58 in the engine connection shaft 34 or any other power transmission part. In the present embodiment, the C0 clutch 150 corresponds to the hydraulically-operated frictional engagement device that is subjected to control executed by the hydraulic control system 160.

Figure 12:
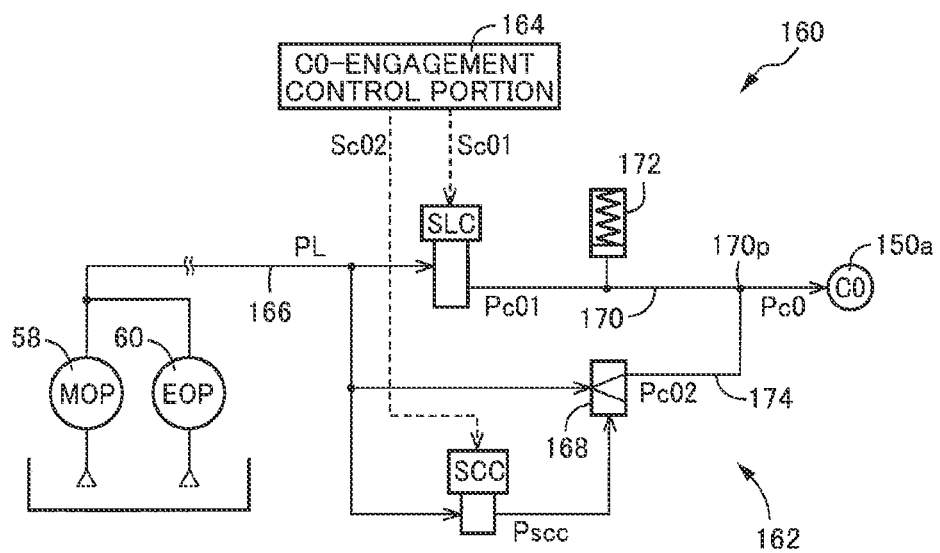
FIG. 12 is a circuit diagram for explaining the hydraulic control system for controlling an operation state of a frictional engagement device in the form of a C0 clutch that is provided in the engine drive vehicle shown in FIG. 11.

As shown in FIG. 12, the hydraulic control system 160 includes a C0-hydraulic control circuit 162 that is to be involved in a hydraulic control of the C0 clutch 150, and a C0-engagement control portion 164 that is functionally included in the electronic control apparatus 90 for controlling the C0 hydraulic pressure Pc0 supplied to a hydraulic actuator 150a of the C0 clutch 150. The C0-hydraulic control circuit 162 includes a line-pressure fluid passage 166 to which the line pressure PL is to be supplied from the MOP 58 and the EOP 60 as the hydraulic-pressure supply sources, a linear solenoid valve SLC configured to receive the line pressure PL as an original pressure and to continuously regulate a first hydraulic pressure Pc01 as an output pressure, a switch valve 168 that is to be mechanically switched between an ON state (output state) in which the switch valve 168 outputs the line pressure PL as a second hydraulic pressure Pc02 and an OFF state (output stop state) in which the switch valve 168 stops outputting the second hydraulic pressure Pc02, and an ON-OFF solenoid valve SCC configured to switch the switch valve 168 between the ON and OFF states. The first hydraulic pressure Pc01 outputted by the linear solenoid valve SLC is supplied as the C0 hydraulic pressure Pc0 to the hydraulic actuator 150a via a first fluid passage 170, wherein the first fluid passage 170 is provided with a damper 172. The second hydraulic pressure Pc02 outputted by the switch valve 168 is supplied as the C0 hydraulic pressure Pc0 to the hydraulic actuator 150a via a second fluid passage 174, wherein the second fluid passage 174 is connected to the first fluid passage 170 at a junction 170p located between the damper 172 and the hydraulic actuator 150a in the first fluid passage 170. Thus, one of the first hydraulic pressure Pc01 and the second hydraulic pressure Pc02, which is higher than the other, is supplied as the C0 hydraulic pressure Pc0 to the hydraulic actuator 150a, so that an engaging torque (C0 clutch torque) Tc0 of the C0 clutch 150 is controlled depending on the supplied C0 hydraulic pressure Pc0. Each of the first and second fluid passages 170, 174 is provided with a check valve or the like, as needed, such that the check valve or the like is disposed on a front side of the junction 170p.

The C0-engagement control portion 164 outputs a first command signal Sc01 and a second command signal Sc02 as the above-described C0 hydraulic control command signal Sc0. The first command signal Sc01 is outputted to control the linear solenoid valve SLC, so as to regulate the first hydraulic pressure Pc01 within a predetermined pressure-regulation control range Pslc (see FIG. 14) that is a relatively low pressure range. The second command signal Sc02 is outputted to control the ON-OFF solenoid valve SCC, so as to execute an ON-OFF switching of the ON-OFF solenoid valve SCC. In the present embodiment, the line pressure PL is directly outputted as an ON-OFF switching hydraulic pressure Pscc by an ON control made to the ON-OFF solenoid valve SCC, and the switch valve 168 is placed into the ON state by the outputted ON-OFF switching hydraulic pressure Pscc, whereby the line pressure PL supplied to the switch valve 168 through the line-pressure fluid passage 166 is directly outputted as the second hydraulic pressure Pc02 to the second fluid passage 174. As is clear from FIG. 14, the second hydraulic pressure Pc02 is a hydraulic pressure which is even higher than the highest pressure value of the pressure-regulation control range Pslc of the first hydraulic pressure Pc01, and which enables the C0 clutch 150 to reliably transmit a large drive power without slipping of the C0 clutch 150 during running of the vehicle 148. In the present embodiment, the second hydraulic pressure Pc02 corresponds to the line pressure PL.

Figure 13:
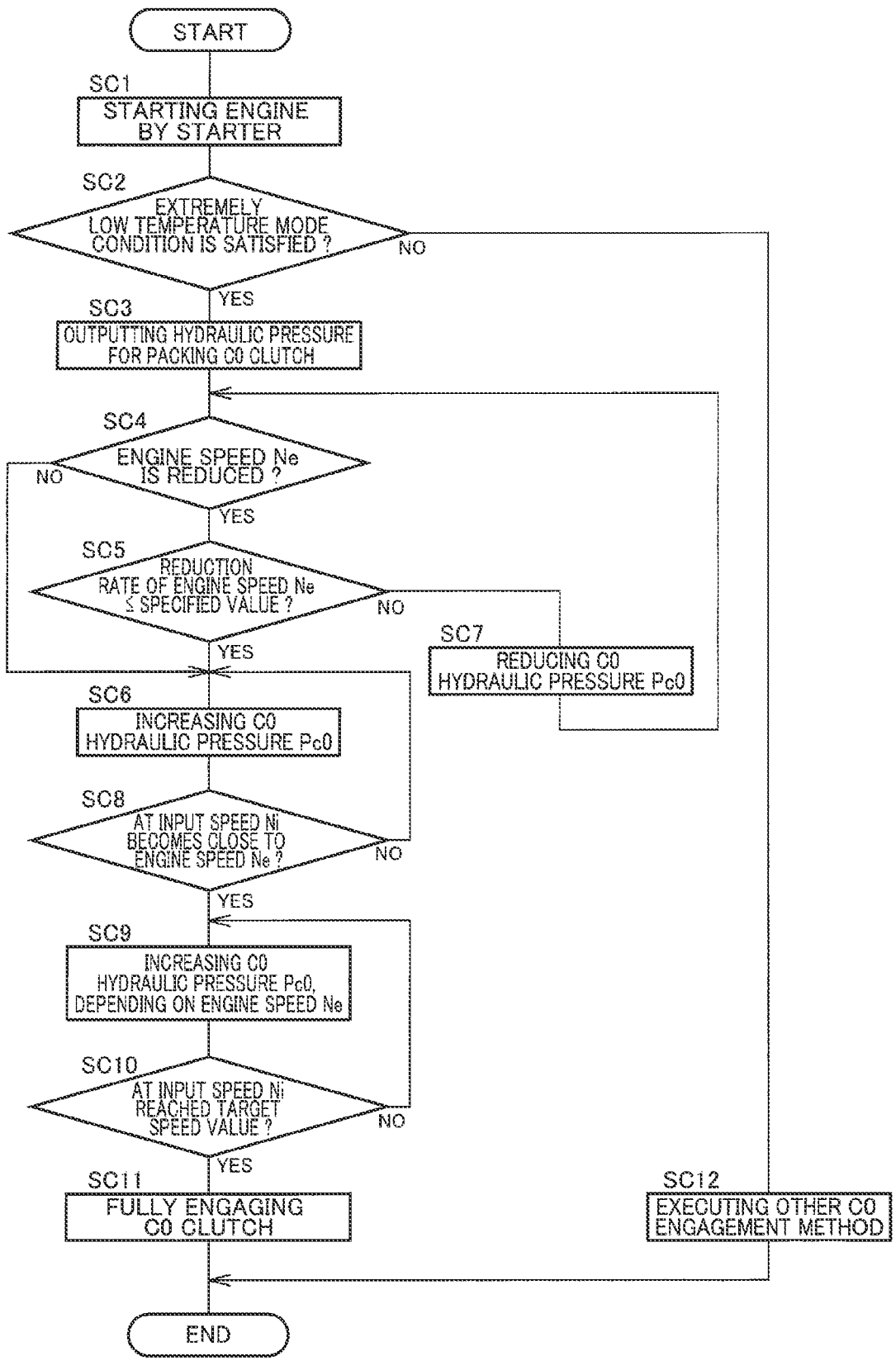
FIG. 13 is a flow chart for explaining operations executed in the engine drive vehicle of FIG. 11, for engaging the C0 clutch after start of an engine, for example, when the vehicle is to start running.
Figure 14:
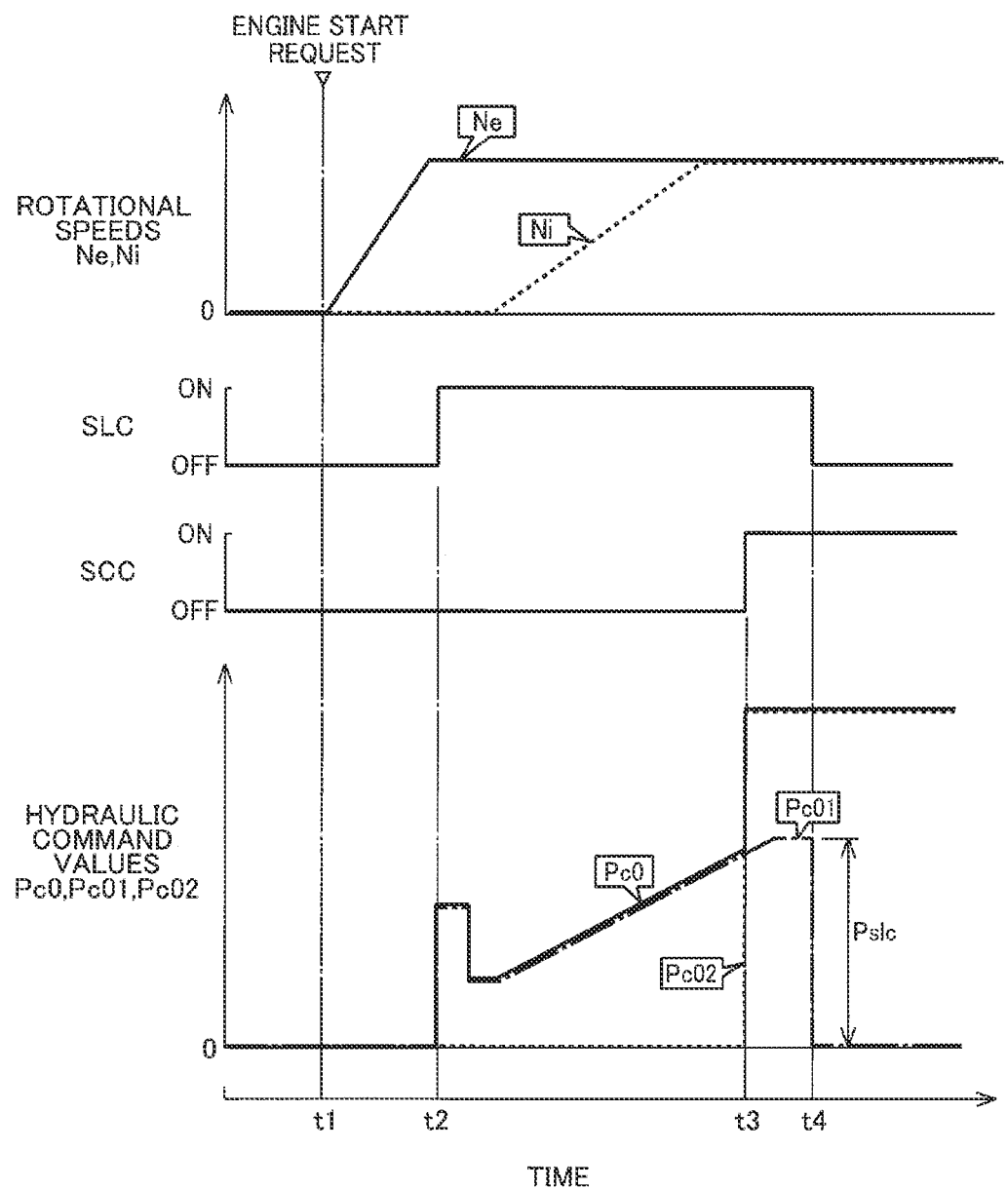
FIG. 14 is an example of time chart showing changes of operation states of respective parts in a case in which an engagement control of the C0 clutch is executed in accordance with the flow chart of FIG. 13.

The C0-engagement control portion 164 is configured, when the vehicle 148 starts to run, for example, to control the C0 hydraulic pressure Pc0, i.e., the engaging torque Tc0 of the C0 clutch 150, and is configured, when the vehicle 148 is running, to cause the C0 clutch 150 to be fully engaged with a large torque capacity. FIG. 13 is a flow chart for showing a control routine executed by the C0-engagement control portion 164 for engaging the C0 clutch 150 after start of the engine 12 by the starter 12s, so as to start the vehicle 10 to run. FIG. 14 is an example of time chart showing changes of operation states of respective parts in a case in which the engagement control of the C0 clutch 150 is executed in accordance with the flow chart of FIG. 13. The control routine shown in the flow chart of FIG. 13 is substantially the same as the control routine shown in the flow chart of FIG. 4, which is executed in the engagement control of the K0 clutch 20 upon start of the engine 12 in the above-described embodiment. Further, the time chart of FIG. 14 is substantially the same as that of FIG. 5, only except for increase of the AT input rotational speed Ni by the slip engagement control of the C0 clutch 150, in place of increase of the MG rotational speed Nmg by the slip engagement control of the K0 clutch 20 upon start of running of the vehicle.

In the vehicle running-start control shown in FIGS. 13 and 14, during normal running of the vehicle 148 after start of the running, the C0 clutch 150 is placed in the fully engaged state with the second hydraulic pressure Pc02 (that is a high hydraulic pressure) being supplied to the C0 clutch 150 by the ON-OFF switching of the ON-OFF solenoid valve SCC. Therefore, it is sufficient that the linear solenoid valve SLC, which is operated to control the slipping engaged state of the C0 clutch 150 upon start of the vehicle 148, is capable of regulating the first hydraulic pressure Pc01 within the pressure-regulation control range Pslc which is lower than the second hydraulic pressure Pc02 and which does not have to be wide and may be narrow. Thus, the engaging torque Tc0 of the C0 clutch 150, which is to be in the slip engagement upon start of running of the vehicle 148, is controlled by the linear solenoid valve SLC with high accuracy and high responsiveness, so that it is possible to smoothly start the vehicle 148 to run even at an extremely low temperature that increases the viscosity of the working fluid.

Thus, in the hydraulic control system 160 according to the present embodiment, too, the large torque capacity is provided by the second hydraulic pressure Pc02 when the C0 clutch 150 is fully engaged, and the engaging torque of the C0 clutch 150 can be controlled with high accuracy and responsiveness by regulation of the first hydraulic pressure Pc01 through the linear solenoid valve SLC when the engaging torque Tc0 needs to be finely controlled, for example, in the slip engagement region (at steps SL3 through SL10 in the control routine shown in FIG. 13). Thus, it is possible to assure the large torque capacity required to transmit a large drive power during running of the vehicle 148, and to appropriately control the slip engaging torque Tc0 of the C0 clutch 150 upon start of running of the vehicle 148 by the engine 12, for example. Further, since the control can be made by merely cooperation of the linear solenoid valve SLC and the ON-OFF solenoid valve SCC, the hydraulic control system 160 as a whole can be constructed at a low cost. Thus, the present embodiment provides substantially the same effects as the above-described embodiment.

It is to be understood that the embodiments described above are given for illustrative purpose only, and that the present disclosure may be embodied with various modifications and improvements which may occur to those skilled in the art.

NOMENCLATURE OF ELEMENTS

10: hybrid electrically-operated vehicle (vehicle)
12: engine (drive power source)
16; 152: power transmission apparatus
20: K0 clutch (connection/disconnection device, frictional engagement device)
22: torque converter (fluid transmission device)
40: LU clutch (lockup clutch, frictional engagement device)
90: electronic control apparatus
100; 120; 160: hydraulic control system
102: K0-hydraulic control circuit (hydraulic control circuit)
104: K0-engagement control portion (engagement control portion)
108; 128; 168: switch valve
118; 148: engine drive vehicle (vehicle)
122: LU-hydraulic control circuit (hydraulic control circuit)
124: LU-engagement control portion (engagement control portion)
150: C0 clutch (starting clutch, frictional engagement device)
162: C0-hydraulic control circuit (hydraulic control circuit)
164: C0-engagement control portion (engagement control portion)
MG: rotating machine (drive power source)
SLK; SLL; SLC: linear solenoid valve
SCK; SCL; SCC: ON-OFF solenoid valve
Pk01; Plu1; Pc01: first hydraulic pressure
Pk02; Plu2; Pc02: second hydraulic pressure
Pslk; Psll; Pslc: pressure-regulation control range

What is claimed is:

1. A hydraulic control system comprising (i) a linear solenoid valve configured to continuously change a hydraulic pressure, (ii) an ON-OFF solenoid valve configured to output and stop outputting the hydraulic pressure, and (iii) a hydraulically-operated frictional engagement device that is to be engaged with an engaging torque that is based on the hydraulic pressure supplied to the frictional engagement device, the hydraulic control system comprising:
a hydraulic control circuit is configured such that a first hydraulic pressure as the hydraulic pressure that is regulated by the linear solenoid valve and a second hydraulic pressure as the hydraulic pressure that is outputted through an ON-OFF switching of the ON-OFF solenoid valve are suppliable to the same frictional engagement device, and such that the first hydraulic pressure is regulated by the linear solenoid valve to be within a predetermined pressure-regulation control range that is lower than the second hydraulic pressure; and
an engagement control portion configured to supply the first hydraulic pressure to the frictional engagement device while causing the linear solenoid valve to regulate the first hydraulic pressure within the pressure-regulation control range,
the engagement control portion being configured, in a state in which the frictional engagement device is placed in a predetermined engaged state based on the first hydraulic pressure, to supply the second hydraulic pressure to the frictional engagement device through the ON-OFF switching of the ON-OFF solenoid valve, such that the frictional engagement device is placed in a fully engaged state with the engaging torque based on the second hydraulic pressure.

2. The hydraulic control system according to claim 1,
wherein the engagement control portion is configured to execute an engagement control for placing the frictional engagement device in the engaged state with or without slipping of the frictional engagement device, by causing the first hydraulic pressure supplied to the frictional engagement device, to be regulated within the pressure-regulation control range by the linear solenoid valve, and
wherein the engagement control portion is configured, in a state in which the frictional engagement device is engaged based on the first hydraulic pressure without the slipping of the frictional engagement device, to place the frictional engagement device in the fully engaged state, by supplying the second hydraulic pressure to the frictional engagement device through the ON-OFF switching of the ON-OFF solenoid valve.

3. The hydraulic control system according to claim 1, comprising a switch valve that is switched, by the hydraulic pressure outputted by the ON-OFF solenoid valve, between an output state in which the switch valve outputs the second hydraulic pressure and an output stop state in which the switch valve stops outputting the second hydraulic pressure.

4. The hydraulic control system according to claim 1,
wherein the frictional engagement device is a connection/disconnection device which is disposed between an engine and a rotating machine that are provided in a vehicle, and
wherein the connection/disconnection device is configured to connect and disconnect transmission of a power between the engine and the rotating machine.

5. The hydraulic control system according to claim 4,
wherein the engagement control portion is configured, in a state in which the rotating machine is driven to be rotated at a predetermined rotational speed, to cause the first hydraulic pressure to be supplied to the connection/disconnection device, and is configured to cause the first hydraulic pressure to be regulated within the pressure-regulation control range by the linear solenoid valve, such that the engine is cranked by a slip engagement of the connection/disconnection device based on the first hydraulic pressure, and
wherein the engagement control portion is configured, in a complete explosion state in which the engine has become self-rotated by an engine start processing including fuel injection and ignition, to place the frictional engagement device in the fully engaged state, by supplying the second hydraulic pressure to the frictional engagement device through the ON-OFF switching of the ON-OFF solenoid valve.

6. The hydraulic control system according to claim 1,
wherein the frictional engagement device is a lockup clutch of a fluid transmission device that is provided in a vehicle.

7. The hydraulic control system according to claim 1,
wherein the frictional engagement device is a starting clutch which is disposed between a drive power source and a power transmission apparatus that are provided in a vehicle, and
wherein the starting clutch is configured to connect and disconnect transmission of a power between the drive power source and the power transmission apparatus.

8. The hydraulic control system according to claim 7,
wherein the engagement control portion is configured, in a state in which the drive power source is driven to be rotated at a predetermined rotational speed, to cause the first hydraulic pressure to be supplied to the starting clutch, and is configured to cause the first hydraulic pressure to be regulated within the pressure-regulation control range by the linear solenoid valve, such that the vehicle is started to run by a slip engagement of the starting clutch based on the first hydraulic pressure, and wherein the engagement control portion is configured, in a state in which the vehicle has been started to run, to place the starting clutch in the fully engaged state, by supplying the second hydraulic pressure to the starting clutch through the ON-OFF switching of the ON-OFF solenoid valve.

\* \* \* \* \*